(12) United States Patent
Knight

(10) Patent No.: US 10,455,815 B2
(45) Date of Patent: Oct. 29, 2019

(54) PET LEASH WITH PET WASTE PICKUP/CARRY BAG

(71) Applicant: Daniel J. Knight, Lexington, KY (US)

(72) Inventor: Daniel J. Knight, Lexington, KY (US)

( * ) Notice: Subject to any disclaimer, the term of this patent is extended or adjusted under 35 U.S.C. 154(b) by 194 days.

(21) Appl. No.: 15/642,565

(22) Filed: Jul. 6, 2017

(65) Prior Publication Data

US 2018/0007868 A1    Jan. 11, 2018

Related U.S. Application Data

(60) Provisional application No. 62/359,492, filed on Jul. 7, 2016.

(51) Int. Cl.
*A01K 27/00* (2006.01)
*E01H 1/12* (2006.01)

(52) U.S. Cl.
CPC .......... *A01K 27/008* (2013.01); *A01K 27/003* (2013.01); *E01H 1/1206* (2013.01)

(58) Field of Classification Search
CPC .... A01K 27/008; A01K 27/003; A01K 23/00; A01K 23/005; E01H 1/1206
See application file for complete search history.

(56) References Cited

U.S. PATENT DOCUMENTS

| | | | | |
|---|---|---|---|---|
| 4,069,994 A | * | 1/1978 | Wharmby | B65B 67/125 248/101 |
| 4,125,212 A | * | 11/1978 | Courchesne | A45C 7/0059 224/153 |
| 5,000,500 A | * | 3/1991 | Almog | E01H 1/1206 15/257.1 |
| 5,183,227 A | * | 2/1993 | Wilhite | B65B 67/1205 248/99 |
| 5,385,376 A | * | 1/1995 | Malaspina | E01H 1/1206 15/257.6 |
| 5,713,616 A | * | 2/1998 | Knudson | E01H 1/1206 206/223 |
| 5,718,192 A | * | 2/1998 | Sebastian | A01K 27/006 119/795 |
| RE35,814 E | * | 6/1998 | Olson | A41D 19/0068 15/227 |
| 6,019,067 A | * | 2/2000 | Carey | A01K 27/006 119/795 |
| 6,035,809 A | * | 3/2000 | Fingerett | A01K 27/004 119/796 |

(Continued)

*Primary Examiner* — Joshua D Huson
(74) *Attorney, Agent, or Firm* — Hamre, Schumann, Mueller & Larson, P.C.

(57) ABSTRACT

A pet leash with a removably attached disposable plastic bag for picking up dog waste and holding the dog waste during a walk. The plastic bag can be removably contained within a pouch that is removably attached to the leash. During a walk, when needing to retrieve pet waste, the bag can be opened and the user insert his hand from the bottom of the bag and the bag is partially or completely turned inside-out for retrieving the pet waste. With the hand in the bag it is possible to reach down and pick up the dog waste by grasping the pet waste through the material of the bag. After all the waste is grasped, the user pulls his hand back through the bag to return the bag back to its original orientation with the pet waste within the bag. The bag can then be closed and later removed from the leash to dispose of the bag with the pet waste therein.

7 Claims, 27 Drawing Sheets

(56) References Cited

U.S. PATENT DOCUMENTS

| | | | | |
|---|---|---|---|---|
| 6,048,008 A * | 4/2000 | Shaw | E01H 1/1206 | 294/1.3 |
| 6,073,590 A * | 6/2000 | Polding | A01K 27/006 | 119/795 |
| 6,085,695 A * | 7/2000 | Miller | A01K 27/006 | 119/795 |
| 6,199,737 B1 * | 3/2001 | Ringelstetter | E01H 1/1206 | 150/108 |
| 6,257,473 B1 * | 7/2001 | Ringelstetter | E01H 1/1206 | 119/795 |
| 6,279,975 B1 * | 8/2001 | Gamliel | B65B 67/1238 | 15/257.1 |
| 6,418,881 B1 * | 7/2002 | Starratt | A01K 27/006 | 119/769 |
| 6,497,198 B2 * | 12/2002 | Evans | A01K 27/006 | 119/858 |
| 6,641,187 B2 * | 11/2003 | Hsu | B65B 51/043 | 248/99 |
| 6,827,491 B2 * | 12/2004 | Kohl | B65D 33/007 | 383/33 |
| 6,991,373 B2 * | 1/2006 | Carr | A61J 19/00 | 220/495.11 |
| 7,063,045 B2 * | 6/2006 | Van Meter | A01K 27/006 | 119/795 |
| 7,416,337 B2 * | 8/2008 | Munch-Fals | B65D 33/007 | 383/34 |
| 8,292,338 B1 * | 10/2012 | Baghdasaryan | E01H 1/1206 | 294/1.3 |
| 9,038,248 B1 * | 5/2015 | Linn | A01K 23/005 | 24/298 |
| 9,078,417 B1 * | 7/2015 | Lees | A45F 5/021 | |
| 9,220,240 B1 * | 12/2015 | Gooden | A01K 23/005 | |
| 9,556,570 B1 * | 1/2017 | Wawrzynowski | E01H 1/1206 | |
| 9,565,836 B2 * | 2/2017 | Conley | A01K 27/008 | |
| 9,861,078 B1 * | 1/2018 | Mantelli | A01K 27/008 | |
| 9,951,489 B2 * | 4/2018 | Rong | E01H 1/1206 | |
| 2003/0155783 A1 * | 8/2003 | Hsu | B65B 51/043 | 294/214 |
| 2005/0087147 A1 * | 4/2005 | Van Meter | A01K 27/006 | 119/795 |
| 2006/0054107 A1 | 3/2006 | Baker | | |
| 2007/0222240 A1 * | 9/2007 | Sherman | A01K 23/005 | 294/1.5 |
| 2008/0101731 A1 * | 5/2008 | Carlson | E01H 1/1206 | 383/41 |
| 2009/0152884 A1 * | 6/2009 | Ruscil | B65G 7/12 | 294/1.5 |
| 2009/0172926 A1 * | 7/2009 | Kern | A01K 27/003 | 24/444 |
| 2009/0205585 A1 * | 8/2009 | La Herran | A01K 27/006 | 119/795 |
| 2009/0315350 A1 * | 12/2009 | Allen | E01H 1/1206 | 294/1.3 |
| 2011/0011504 A1 * | 1/2011 | Steinbacher | A01K 27/006 | 150/106 |
| 2011/0132952 A1 * | 6/2011 | Peterson-Malesci | A45F 5/02 | 224/660 |
| 2012/0193386 A1 * | 8/2012 | McFarland | A45C 3/00 | 224/666 |
| 2012/0286003 A1 * | 11/2012 | Shadday | E01H 1/1206 | 224/191 |
| 2013/0223970 A1 * | 8/2013 | Surber | E01H 1/1206 | 414/800 |
| 2015/0053145 A1 * | 2/2015 | Miksovsky | A01K 27/003 | 119/772 |
| 2015/0144072 A1 * | 5/2015 | Whitefield | A01K 27/006 | 119/795 |
| 2015/0157104 A1 * | 6/2015 | Jang | A01K 27/008 | 150/107 |
| 2015/0204036 A1 * | 7/2015 | Johnson | E01H 1/1206 | 294/1.3 |
| 2015/0375933 A1 * | 12/2015 | First | A45F 3/00 | 206/38 |
| 2016/0023807 A1 * | 1/2016 | Tappan | A01K 27/008 | 383/120 |
| 2016/0128306 A1 * | 5/2016 | Conley | A01K 27/008 | 206/38 |
| 2016/0135432 A1 * | 5/2016 | Cox | A01K 27/003 | 119/795 |
| 2017/0002531 A1 * | 1/2017 | Byham | E01H 1/1206 | |
| 2017/0094945 A1 * | 4/2017 | Sullivan | A01K 27/008 | |
| 2017/0112103 A1 * | 4/2017 | Iles | A01K 27/008 | |
| 2017/0233170 A1 * | 8/2017 | Badurina | A01K 27/008 | 242/557 |

* cited by examiner

PET LEASH WITH PET WASTE PICKUP/CARRY BAG

FIELD

This description describes a pet leash with an integrated pet waste bag that can be used to collect and temporarily carry pet waste during a walk with the pet or other activity.

BACKGROUND

Pet waste cleanup during walking is inconvenient and messy. Carrying extra equipment during a walk is a hassle. Further, touching pet waste through a plastic bag is not desirable, and storage of the waste after pickup during a walk is inconvenient since a garbage can may not be readily available.

There are several products on the market for picking-up pet waste. These products are complicated and require bringing along extra equipment during a walk. Pet waste scoops are available but are cumbersome and not worth carrying. Portable pet waste bag dispensers are available but require that the waste is picked up with just a thin bag between your hand and the waste. Storage of the bag containing the pet waste afterword is an inconvenient issue. There is no solution that allows very convenient pickup and storage of the pet waste while also providing a significant barrier between your hand and the pet waste.

SUMMARY

A pet leash is described that has a bag attached to the leash between the handle end and the pet connection end. For example, the bag can be attached to the leash near the handle end of the leash. The bag, which can be opened and closed, can retain pet waste. During a walk, when needing to retrieve pet waste, the bag can be opened and the user insert his hand from the bottom of the bag and the bag is partially or completely turned inside-out for retrieving the pet waste. With the hand in the bag it is possible to reach down and pick up the dog waste by grasping the pet waste through the material of the bag. After all the waste is grasped, the user pulls his hand back through the bag to return the bag back to its original orientation with the pet waste within the bag. The bag can then be closed and later removed from the leash to dispose of the bag with the pet waste therein.

The pet waste can then be carried in the closed bag that is attached to the leash during the remainder of the walk. The pet waste can be cleanly and easily removed for disposal by detaching the bag from the leash. This process keeps the users hand clean and provides a barrier from the pet waste while allowing the pet waste to be grasped by the user's hand during pick-up.

In one embodiment, the bag can be a pouch with at least one disposable bag removably disposed inside of the pouch. In another embodiment, the bag is a disposable plastic bag that is removably affixed to the leash.

In the case of the pouch with the disposable bag within the pouch, the disposable bag(s) can be removably retained in the pouch in any suitable manner. For example, an elastic band and hook system described herein can be used. Other means that removably retain the disposable bag(s) in the pouch can be used. In addition, the pouch can be opened and closed using any form of closure mechanism examples of which include, but are not limited to, a zipper, hook and loop material, snaps or clasps, buttons, and the like. Because the pouch and the disposable bag are turned inside-out while retrieving the pet waste, the pouch is always kept clean and the pet waste is contained to the inside and bottom of the disposable bag.

DRAWINGS

DETAILED DESCRIPTION

A pet leash is described that has a bag removably attached to the leash between the handle end and the pet connection end by a bag attachment apparatus located between the pet connection end and the handle end. In one embodiment described and illustrated herein, the bag attachment apparatus can include a pouch with at least one disposable plastic bag removably disposed inside of the pouch. In another embodiment, the bag can be removably attached to the leash without the use of the pouch. The bag attachment apparatus can have any form suitable for removably attaching the bag to the leash. For sake of convenience, the bag will hereinafter be described as being at least one disposable plastic bag removably disposed inside of a pouch. However, it is possible that the disposable plastic bag can be used without the pouch described below by attaching the disposable plastic bag to leash in a similar manner to the pouch as described further below.

Referring to FIGS. 1-5, a pet leash 2 with a pouch 1 attached to the leash 2 is illustrated. The pouch 1 is intended to allow easy pick-up of dog waste during a walk without the need to carry cumbersome apparatus or containers separately. The leash 2 can be made of any material suitable for forming a pet leash 2 including, but not limited to, cloth or fabric webbing, or leather. The leash 2 includes a pet connection end with a suitable connector 4, such as a clasp, for connection to a dog collar, and a user handle end that defines a handle 10 for gripping by a user. The pouch 1 can be made of any suitable material including, but not limited to, cloth or leather or plastic. For example, the pouch 1 can be made from two or more layers of light and flexible fabric which can be washable to permit cleaning of the pouch 1.

The pouch 1 can attached to the leash 2 anywhere between the pet connection end with the connector 4 and the handle 10. For example, as illustrated in FIGS. 1-5, the pouch 1 can be attached to the leash 2 at a position that is closer to the handle 10 than to the connector 4. In one embodiment, the pouch 1 can be attached to the leash 2 at a position that is approximately 75% of the length of the leash 2, i.e. the pouch 1 is positioned approximately ¾ of the length of the leash 2 from the connector 4 or ¼ of the length of the leash 2 away from the handle 10.

The pouch 1 can be attached to the leash 2 in any suitable manner. For example, the pouch 1 can be attached to the leash 2, for example by being attached by sewing to the leash 2. In another embodiment, the pouch 1 can be removably attached to the leash 2 in a manner that allows the pouch 1 to be non-destructively removed from the leash 2, for example by being attached using hook and loop type fastening, snap buttons, or other removable fastening.

Figure 21:
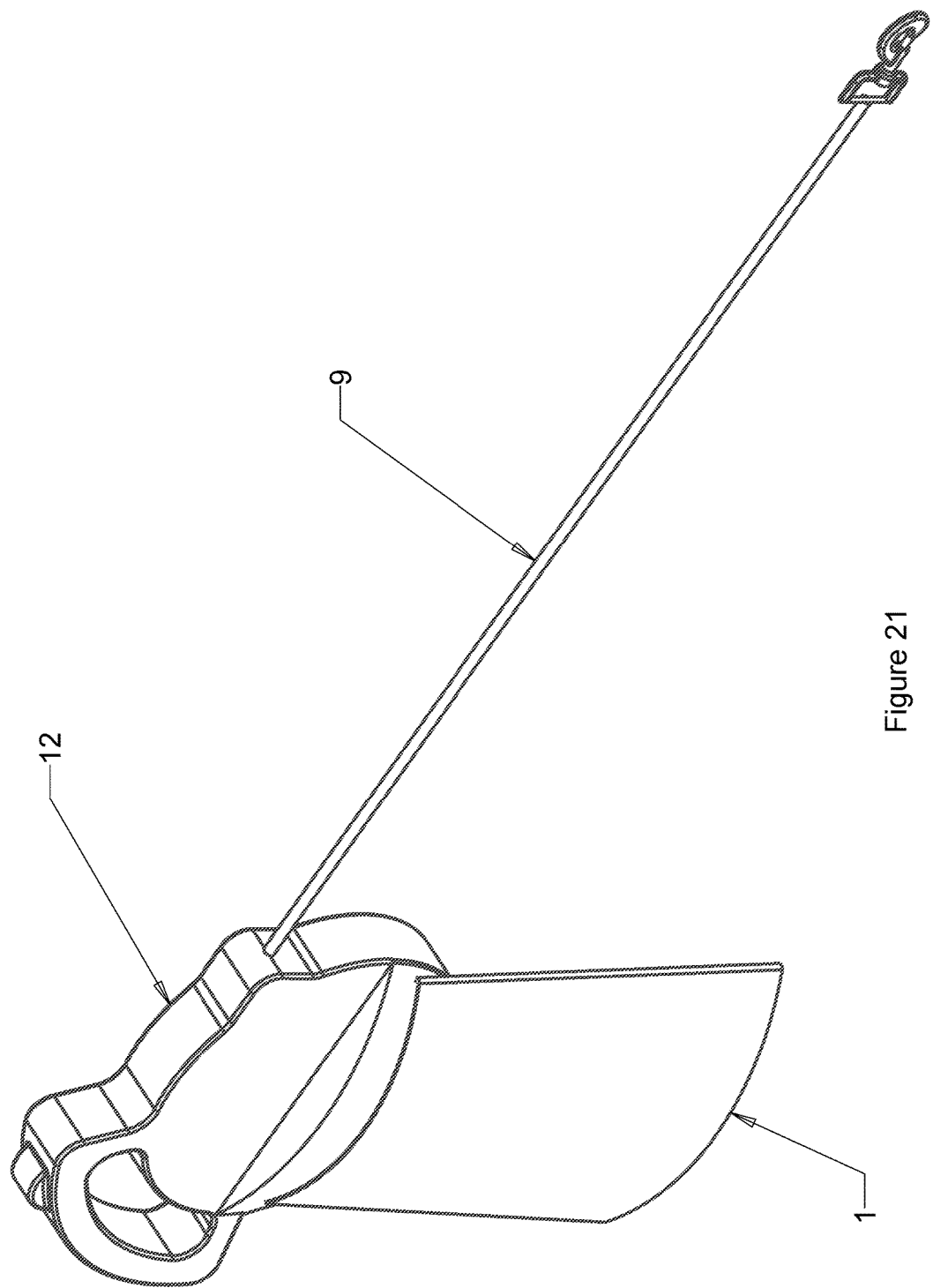
FIG. 21 illustrates a retractable leash utilizing a waste retrieval pouch that can be similar to the pouch in FIGS. 1-6 or in FIGS. 7-20.

In the embodiment illustrated in FIGS. 1-5, the leash 2 is illustrated as being split into two portions 2a, 2b at a location between the connector 4 and the handle 10. The pouch 1 is secured to the leash 2 between the two portions 2a, 2b. Therefore, in this embodiment, the pouch 1 is not directly secured to the handle 10. The pouch 1 can be permanently or non-removably secured to the two leash portions 2a, 2b (i.e. the pouch 1 is not intended to be removable from the leash 2) using a suitable type of connection including, but not limited to, sewing the pouch 1 to the two leash portions 2a, 2b. In another embodiment, the pouch 1 can be removably secured to the two leash portions 2a, 2b using a suitable type of removable connection including, but not limited to, hook and loop fastener, permitting the pouch 1 to be removed from the leash 2. In another embodiment illustrated in FIG. 21, the pouch 1 is attached to a housing 12 of a retractable leash 9 where the housing 12 also forms the handle.

Returning to FIGS. 1-5, the pouch 1 has an opening 3 at the top at one end thereof, and a second or opposite end of the pouch is closed. The pouch 1 defines an interior space and one or more disposable bags 5 (shown in FIGS. 2-5) are removably inserted into the interior space of the pouch 1 and the open end(s) of the bag(s) 5 are suitably secured to the pouch 1 near the opening 3 to keep the disposable bag(s) 5 neat and also prevent the bag(s) 5 from falling out when turning the pouch 1 inside-out for waste pick up. The bag(s) 5 can have a size that is smaller, larger or about the same as the interior size of the pouch 1. The bag(s) 5 can have any size and construction that allows it to be retained inside of the pouch 1 during operation of the leash 2, allow the pouch 1 and bag(s) 5 to be turned inside-out during waste pick-up, and allow removal of the bag 5 from the pouch 1 after waste pick-up. For example, the bag(s) 5 can be plastic grocery bags or bags intended for pet waste retrieval.

Figure 1:
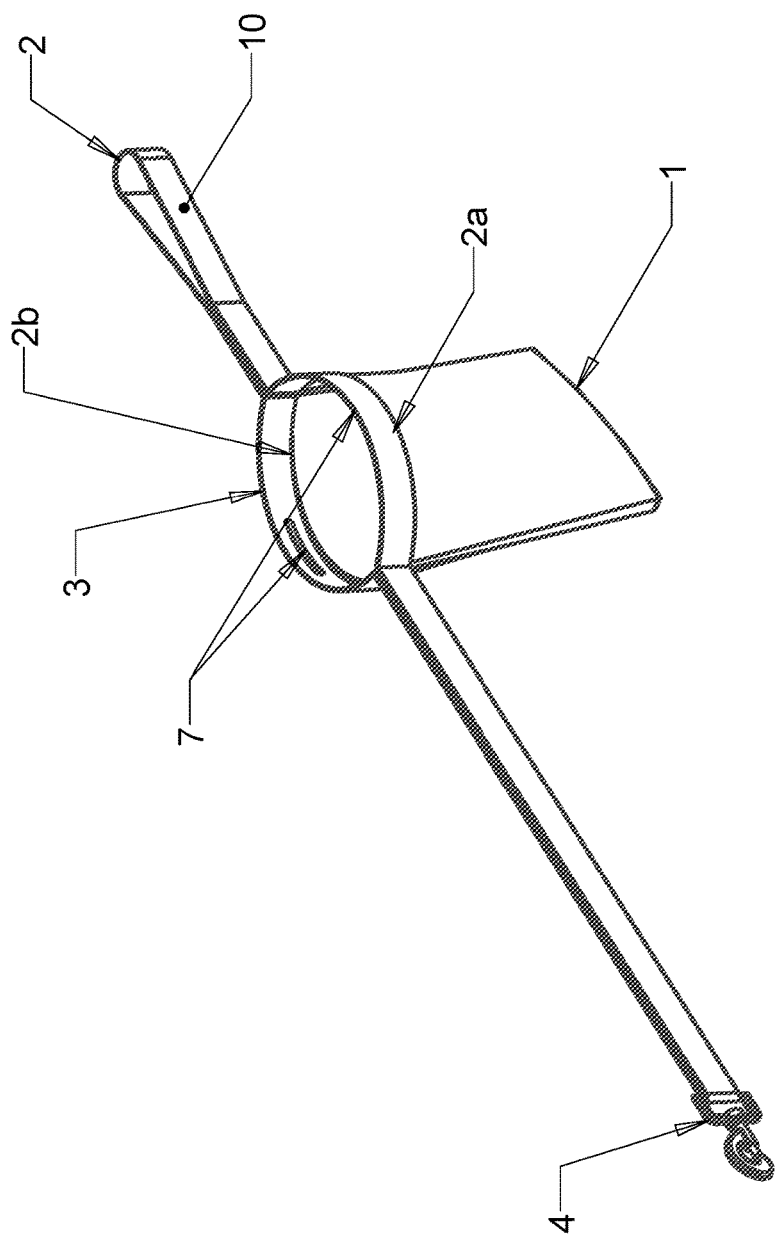
FIG. 1 shows an example of a leash with a pouch without a disposable bag installed.

Referring to FIG. 1, the leash portions 2a, 2b can be provided with bag retainers 7. The bag retainers 7 can be constructed from thin rubber secured to the leash portions 2a, 2b and have a slit in them so that the ends of the disposable bag(s) 5 can be tucked into the slits. The slits allow the ends of the bag(s) 5 to reside between the two or more layers of fabric that the pouch 1 can be constructed of. This gives a tidy and clean appearance to the pouch 1 while walking, and also prevents the disposable bag(s) 5 from falling out when turning inside-out to retrieve pet waste.

In one embodiment, the pouch opening 3 can be closed using a suitable closure mechanism in order to close the opening 3. Examples of suitable closure mechanisms include, but are not limited to, magnets or a zipper that allow the sides of the pouch 1 connected to the leash portions 2a, 2b to be secured together to close the opening 3. Alternatively, one can simply flip the pouch 1 over the leash 2 effectively sealing the pouch 1. A mechanism such as a hook and loop fastener could be used to hold the pouch 1 in that position.

Figure 2:
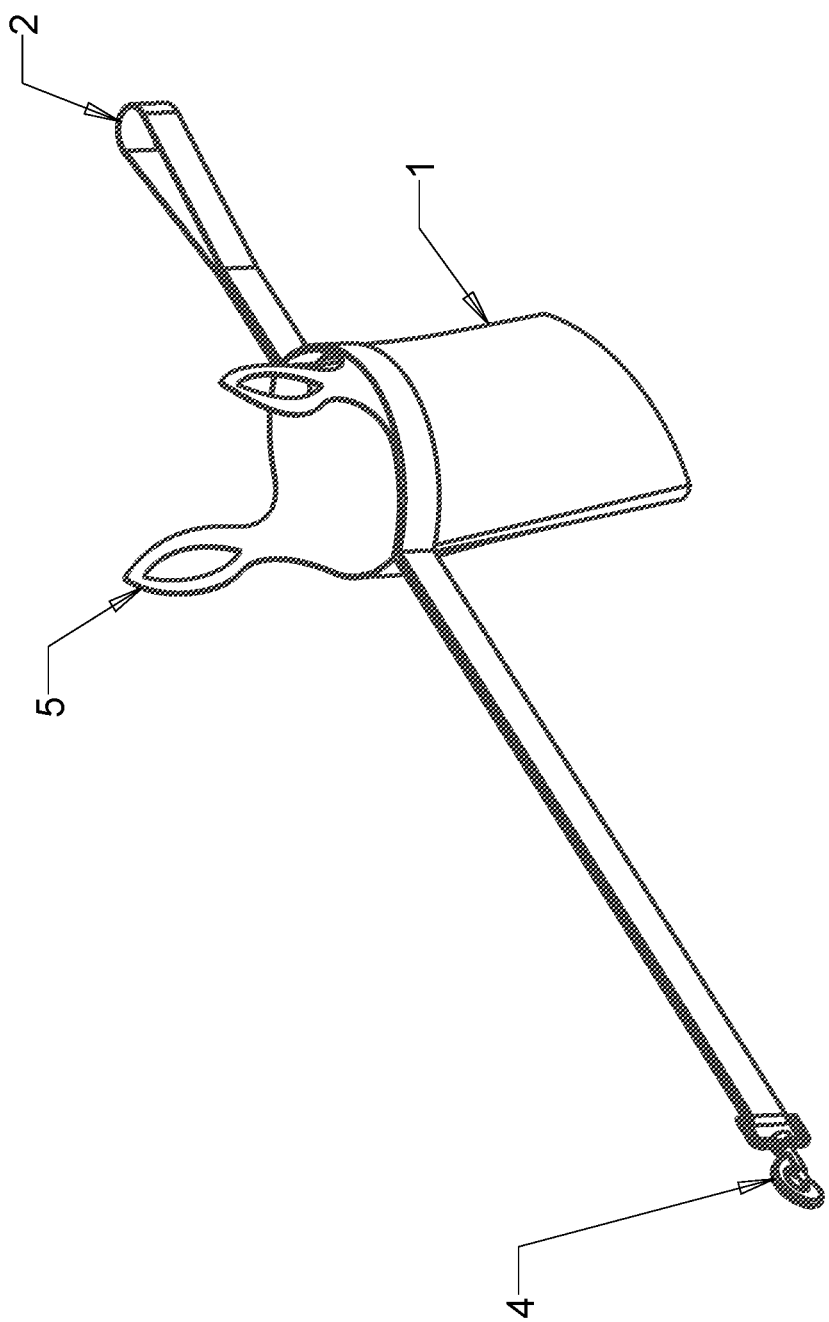
FIG. 2 illustrates the leash and the pouch of FIG. 1 with a disposable bag inserted into the pouch.
Figure 3:
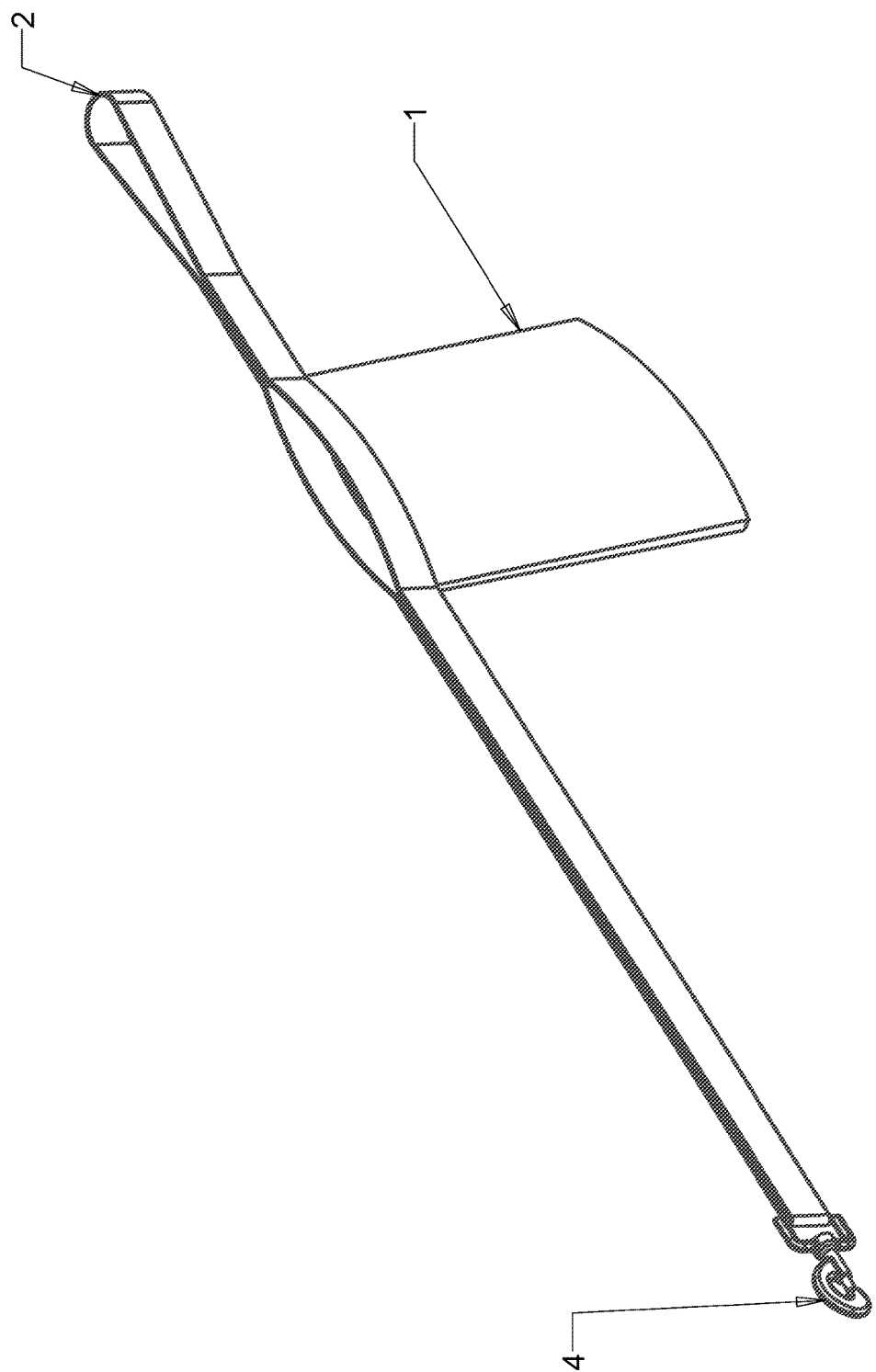
FIG. 3 illustrates the leash and the pouch of FIG. 2 with the disposable bag inserted in the pouch with the ends of the disposable bag tucked into the internal retainer and the opening closed and ready to walk the dog.

FIG. 2 illustrates an embodiment where an upper end of the bag(s) 5 extends above the pouch 1 and the bag(s) 5 is provided with handles to facilitate grasping of the bag(s) 5 during removal of the bag 5 from the pouch 1.

Figure 4:
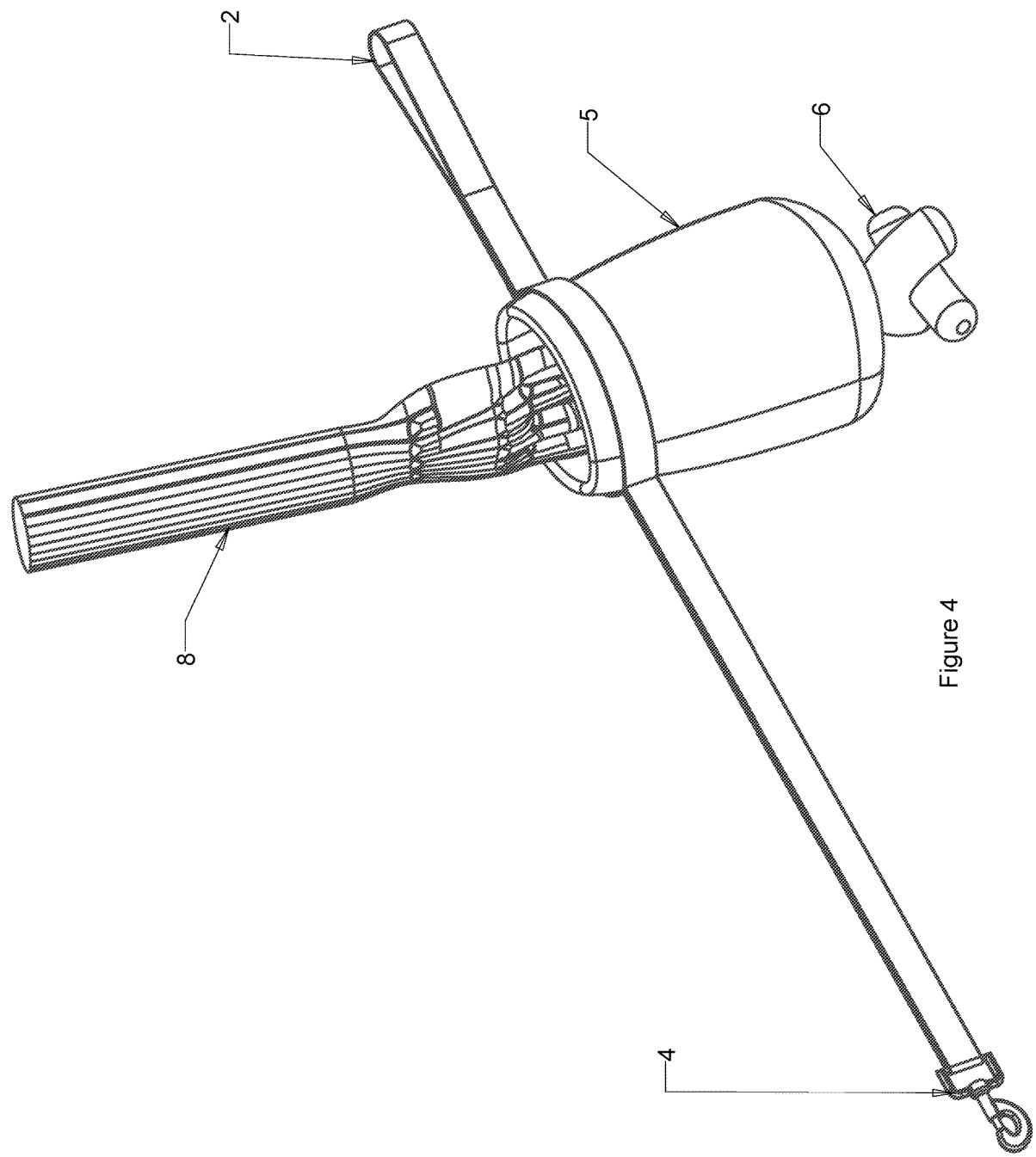
FIG. 4 illustrates the leash of FIG. 3 with the pouch and the disposable bag turned inside-out with a user's hand inserted from the bottom to pick-up dog waste.
Figure 5:
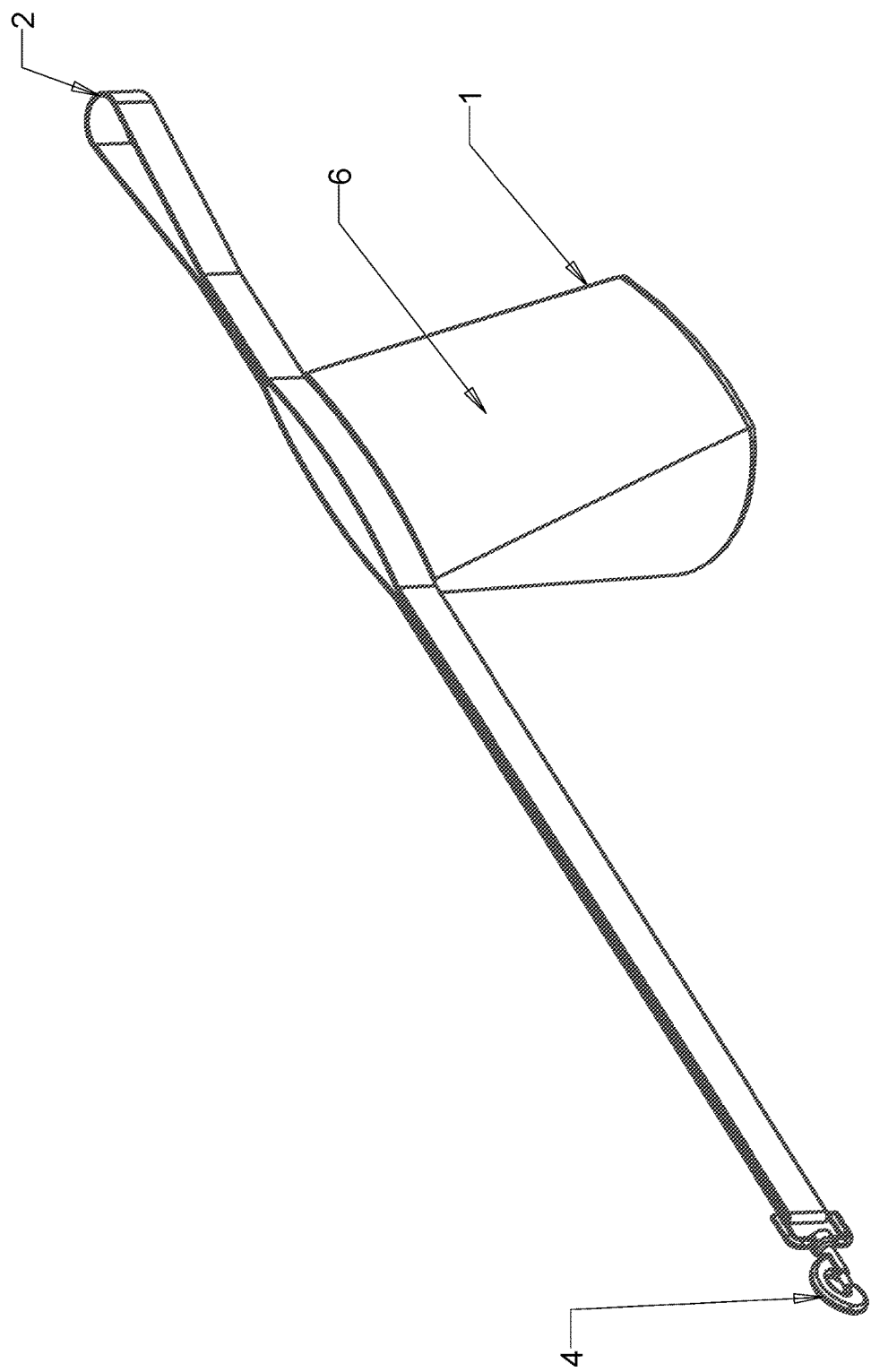
FIG. 5 illustrates the leash of FIG. 4 with the pouch after being pulled back to its original configuration (no longer inside out) with the dog waste contained in the disposable bag.
Figure 6:
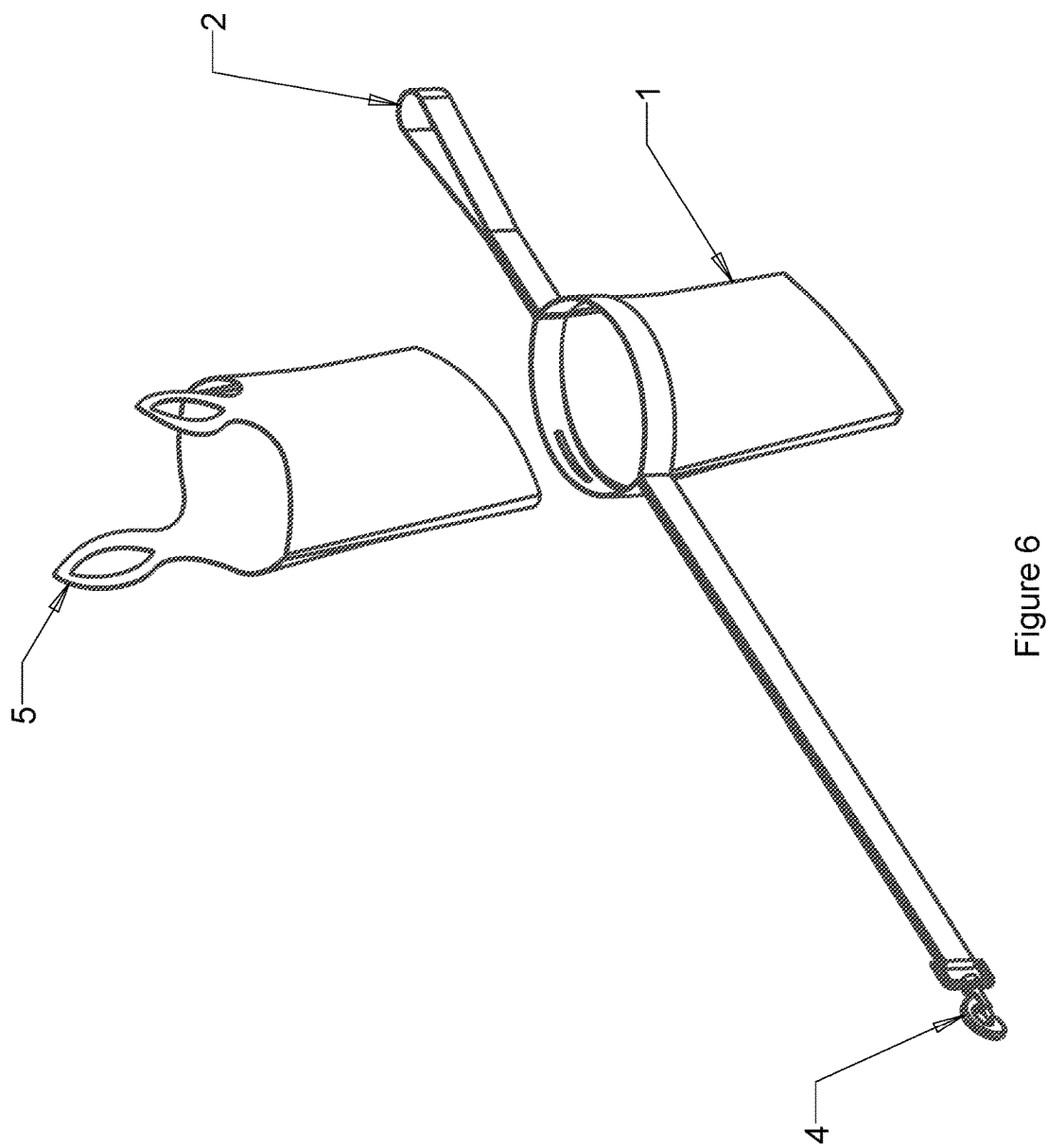
FIG. 6 illustrates the leash with the disposable bag containing the pet waste removed from the pouch and ready for disposal.

In operation, the leash 2 is attached to the dog collar by the connector 4 for a walk. Referring to FIG. 4, assuming the disposable bag 5 has been installed in the pouch 1, when it is necessary to pick up dog waste during the walk, the hand 8 is inserted up from the bottom of the pouch 1 turning the pouch 1 inside-out. The disposable bag 5 is now on the outside of the pouch 1 and the hand 8 is on the inside of the pouch 1. Dog waste 6 is then picked up using the hand 8 in the pouch 1 while being protected by the barrier of the pouch 1 and the disposable bag 5. All of this is done conveniently while the dog is still attached to the leash 2. The dog may actually provide tension in the leash 2 which can make the process easier. Referring to FIG. 5, after grasping all of the pet waste, the hand 8 is drawn back through the pouch 1 turning the pouch 1 back to its original position (no longer inside out). The pouch 1 is suspended from the leash 2 with the dog waste 6 contained inside the disposable bag 5 that is also contained inside the pouch 1. After finishing the walk, the disposable bag 5 can be removed from the pouch 1 (FIG. 6) and disposed of with the pet waste 6 inside. A new disposable bag 5 can then be inserted into the pouch 1 and secured in position ready for the next walk.

Referring to FIGS. 7-20, another embodiment of a pet leash 20 is illustrated. Like the pet leash 2, the leash 20 also includes a pouch 22 attached to the leash 20, a pet connection end with a connector 24 such as a clasp, and a user handle end with a handle 26. The pouch 22 is intended to allow easy pick-up of dog waste during a walk without the need to carry cumbersome apparatus or containers separately. The leash 20 can be made of any material suitable for forming a pet leash including, but not limited to, cloth or fabric webbing, or leather. The pouch 22 can be made of any suitable material including, but not limited to, cloth or leather or plastic. For example, the pouch 22 can be made from two or more layers of light and flexible fabric which can be washable to permit cleaning of the pouch 22.

Figure 7:
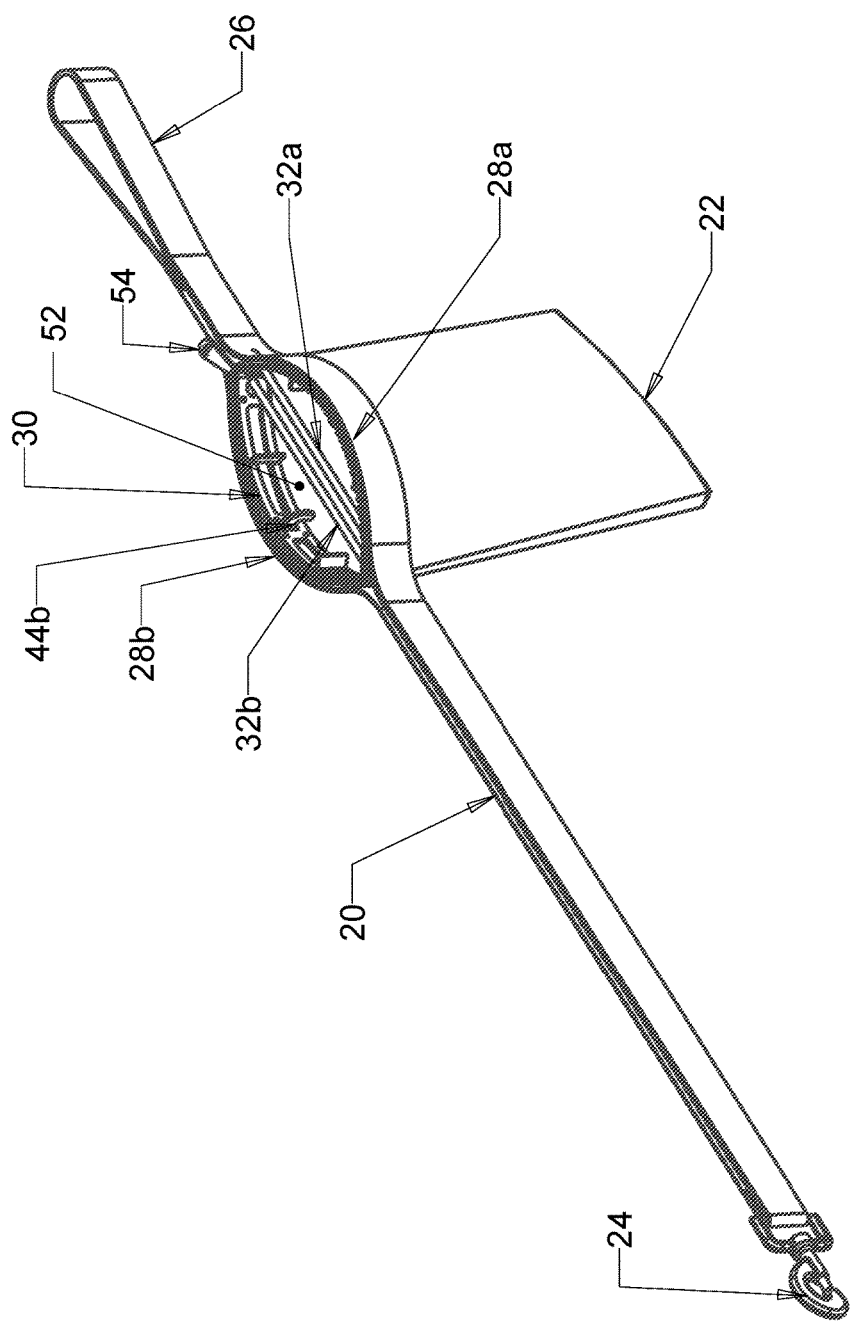
FIG. 7 illustrates another embodiment of a leash with a pouch.
Figure 8:
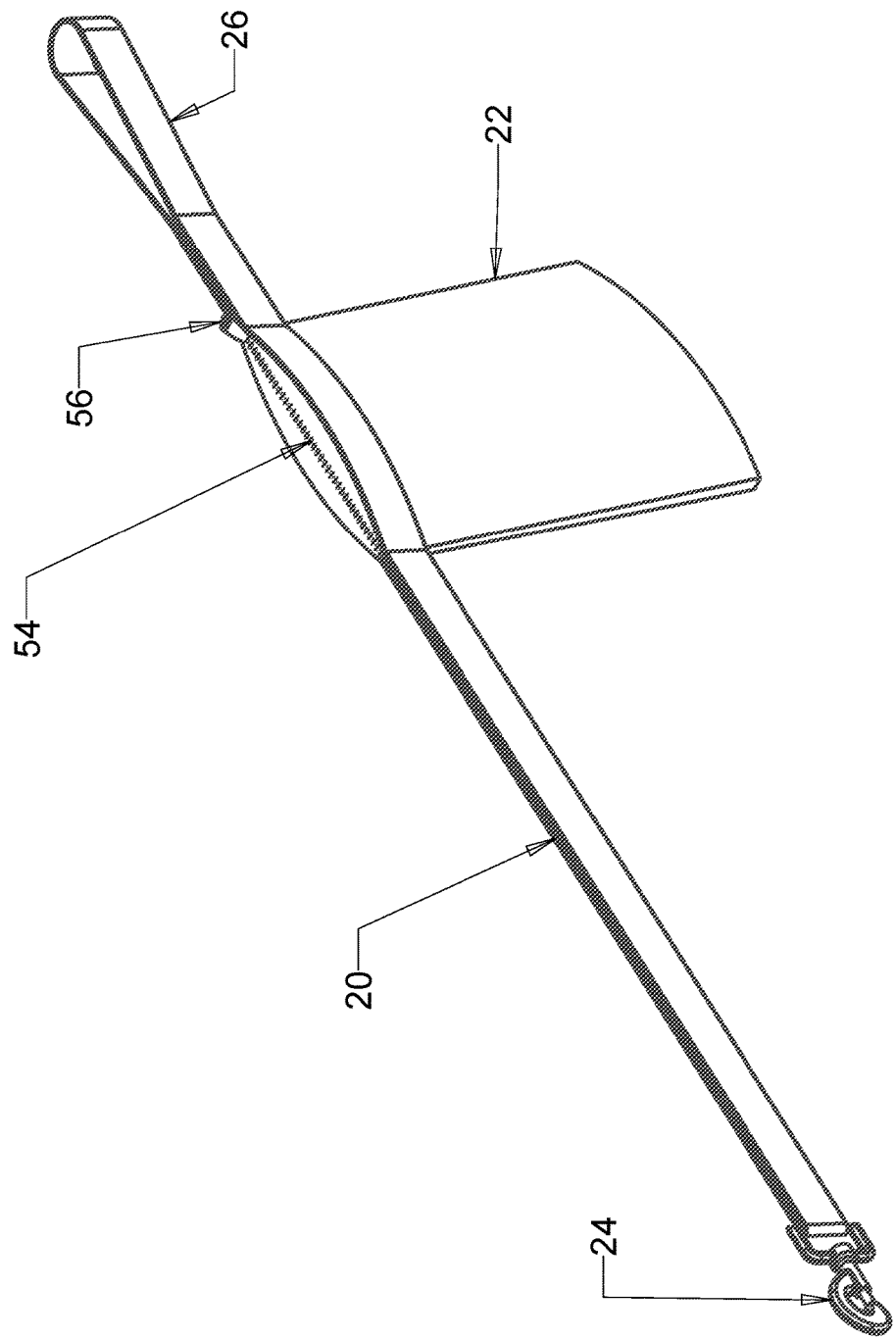
FIG. 8 illustrate the leash of FIG. 7 with the pouch zipped closed.

The pouch 22 can attached to the leash 20 anywhere between the pet connection end with the connector 24 and the handle 26. For example, as illustrated in FIG. 7, the pouch 22 can be attached to the leash 20 at a position that is closer to the handle 26 than to the connector 24. In one embodiment, the pouch 22 can be attached to the leash 20 at a position that is approximately 75% of the length of the leash 20, i.e. the pouch 22 is positioned approximately ¾ of the length of the leash 20 from the connector 24 or ¼ of the length of the leash 20 away from the handle 26.

In this embodiment, the leash 20 is illustrated as being split into two portions 28a, 28b at a location between the connector 24 and the handle 26, and the pouch 22 is secured to the leash 20 between the two portions 28a, 28b. Therefore, in this embodiment, the pouch 22 is not directly secured to the handle 26. The pouch 22 can be permanently or non-removably secured between the two leash portions 28a, 28b (i.e. the pouch 22 is not intended to be removable from the leash 20) using a suitable type of connection including, but not limited to, sewing the pouch 22 to the two leash portions 28a, 28b. In another embodiment, the pouch 22 can be removably secured between the two leash portions 28a, 28b using a suitable type of removable connection including, but not limited to, hook and loop fastener, permitting the pouch 22 to be removed from the leash 20. In another embodiment, the pouch 22 can be attached to the housing 12 of the retractable leash 9 like in FIG. 21.

Figure 9:
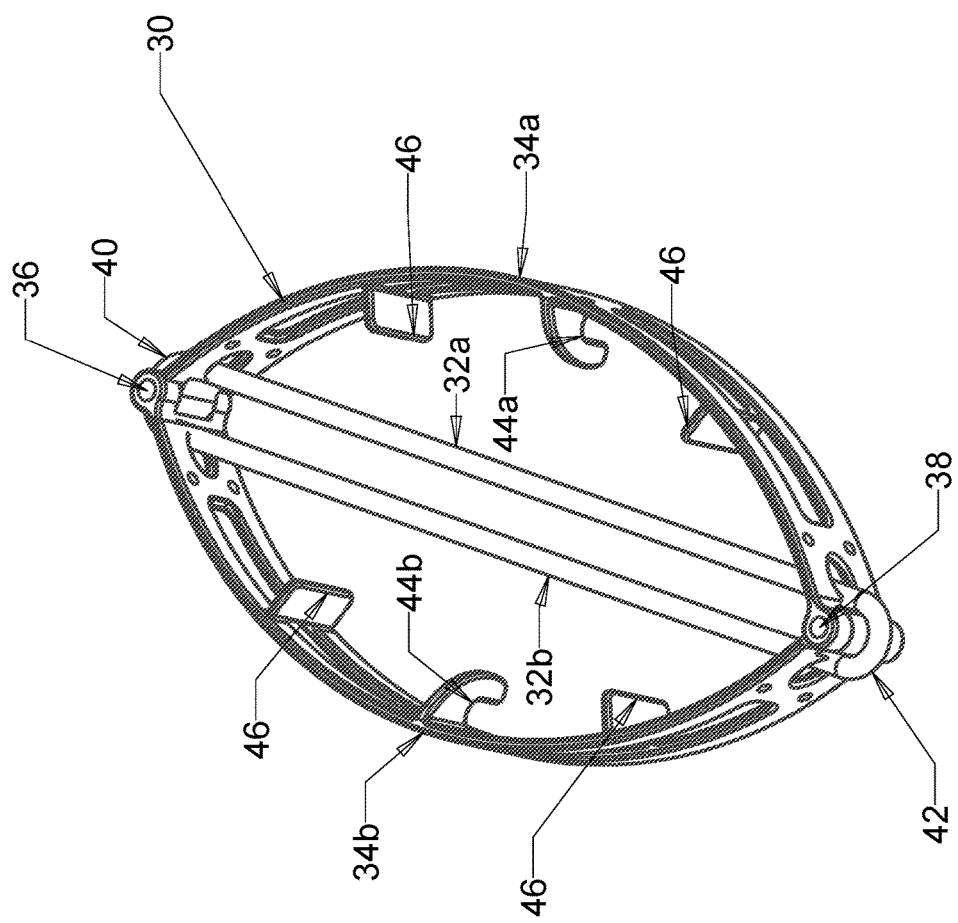
FIG. 9 is a perspective view of a resilient frame that is used in the pouch.
Figure 10:
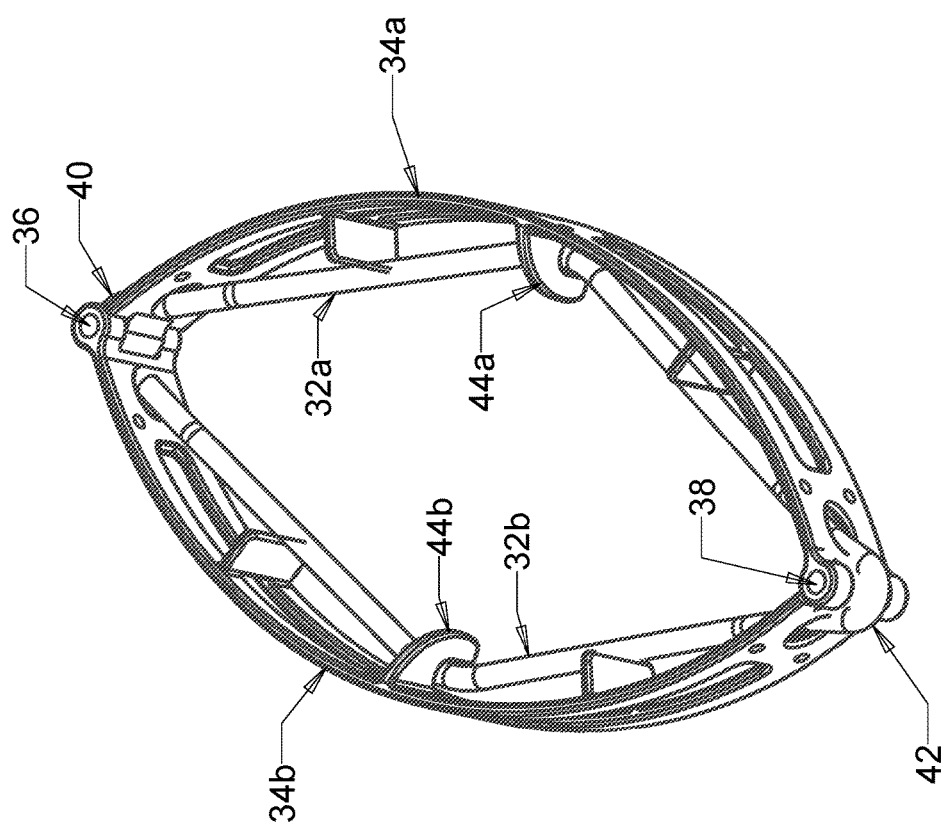
FIG. 10 illustrates elastic cords of the resilient frame secured to hooks of the resilient frame to secure a disposable bag in the pouch.

Referring to FIGS. 7 and 9-10, the pouch 22 can be secured to the portions 28a, 28b by a hinged resilient frame 30 having a pair of elastic cords 32a, 32b attached to the frame 30. As best seen in FIGS. 9-10, the frame 30 includes a pair of resilient frame portions 34a, 34b that can be flexed between a curved, open configuration shown in FIGS. 7, 9 and 10 for retaining the pouch 22 in an open configuration, and a somewhat flat, generally parallel closed configuration shown in FIG. 8 when the pouch 22 is closed. The ends of the frame portions 34a, 34b are hinged together by hinge pins 36, 38 that permit relative pivoting movements of the ends of the frame portions 34a, 34b as the frame portions 34a, 34b flex between their open and closed configurations.

As best seen in FIGS. 9 and 10, the pair of elastic cords 32a, 32b are secured to the frame 30. The cords 32a, 32b extend from one end of the frame 30 to the other end thereof, and are intended to help secure a disposable bag within the pouch 22. The cords 32a, 32b can have any configuration that is suitable for achieving the functions of the cords 32a, 32b. In the illustrated example, the cords 32a, 32b form an endless loop, with the cords 32a, 32b extending through holes in the frame portions 34a, 34b and ends 40, 42 of the cords 32a, 32b looped around the hinge pins 36, 38.

Figure 15:
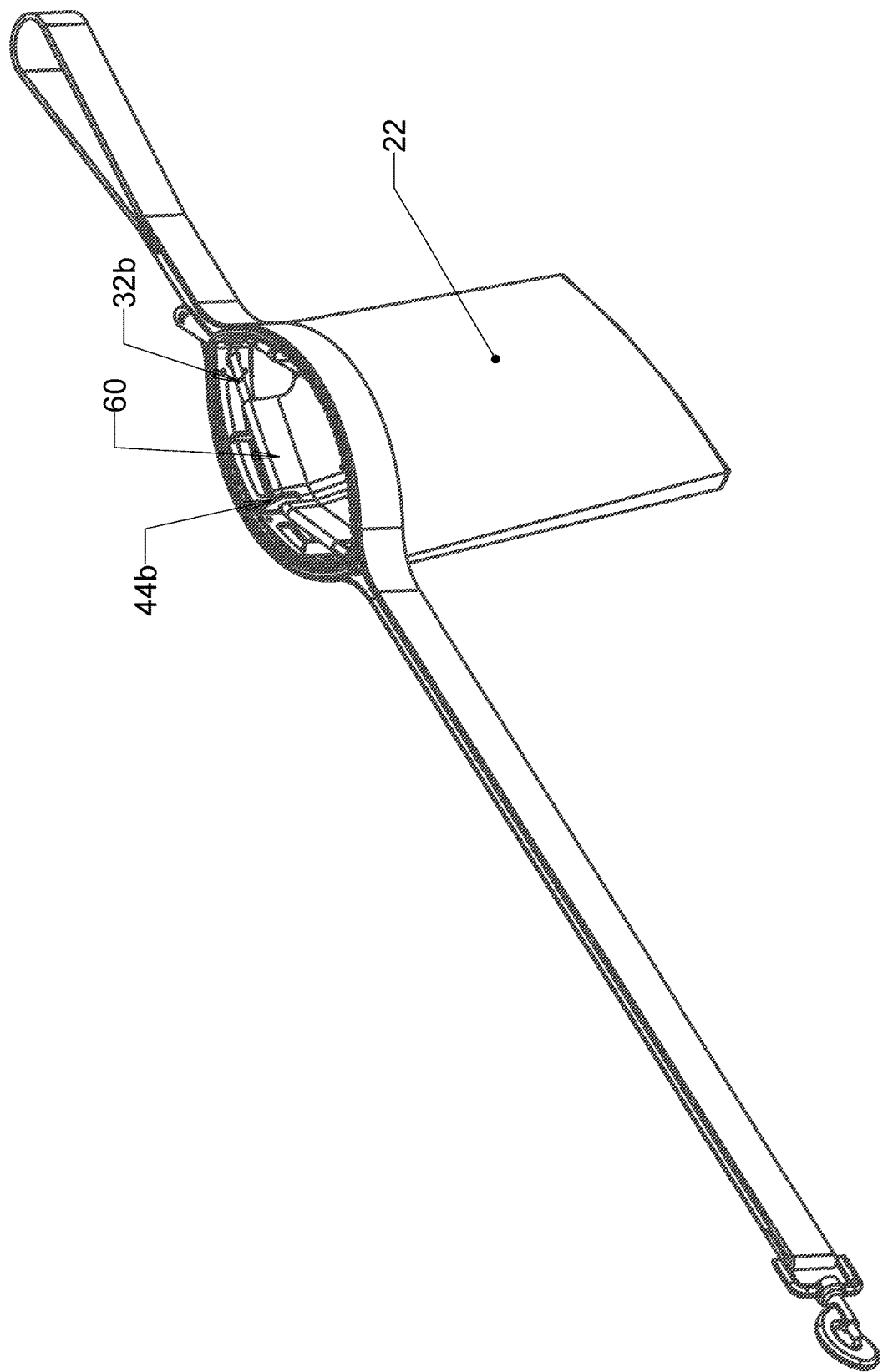
FIG. 15 illustrates the elastic cords secured to the hooks of the resilient frame to secure the disposable bag.
Figure 16:
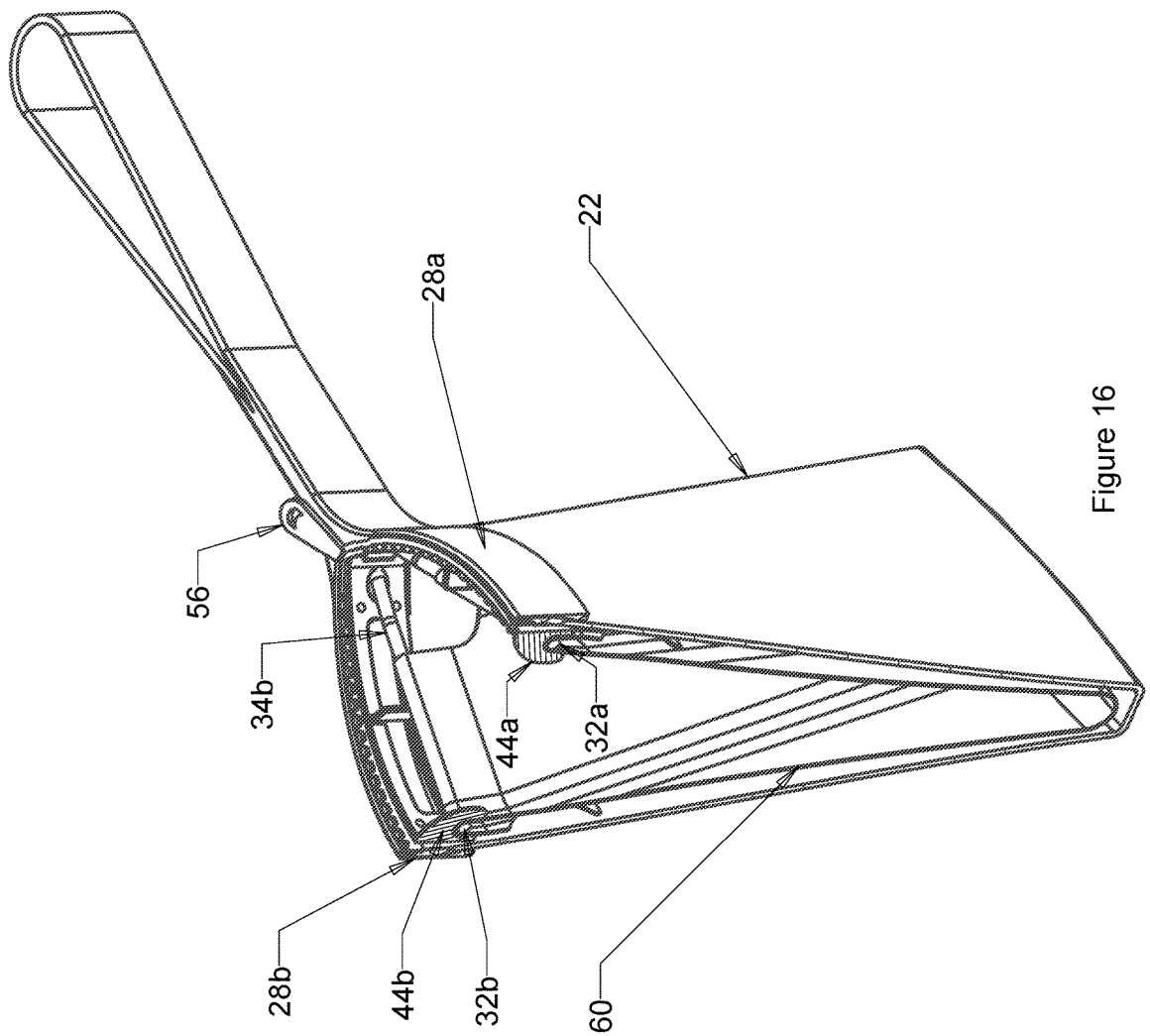
FIG. 16 is a cross-sectional view showing the arrangement between the disposable bag, the resilient frame, the elastic cords, and the hooks.

Each of the frame portions 34a, 34b also includes at least one hook 44a, 44b on interior facing surfaces thereof. The hooks 44a, 44b can be located at any suitable location on the frame portions 34a, 34b for performing the intended function(s) of the hooks 44a, 44b. Referring to FIGS. 10 and 15-16, during use the cords 32a, 32b are hooked under the hooks 44a, 44b to help secure the disposable bag to the pouch 22 and help retain the disposable bag in an open configuration during waste pick-up. In the illustrated example, the hooks 44a, 44b are located approximately midway along the length of the frame portions 34a, 34b. However, the hooks 44a, 44b are preferably slightly laterally offset from one another so that when the frame portions 34a, 34b flex to their closed configuration, the hooks 44a, 44b do not interfere with one another, thereby allowing the frame portions 34a, 34b to close more completely. In addition, a plurality of optional spacers 46 can be provided on the interior facing surfaces of the frame portions 34a, 34b. The spacers 46 help to pinch the disposable plastic bag against the cords 32a, 32b to help retain the bag.

Figure 20:
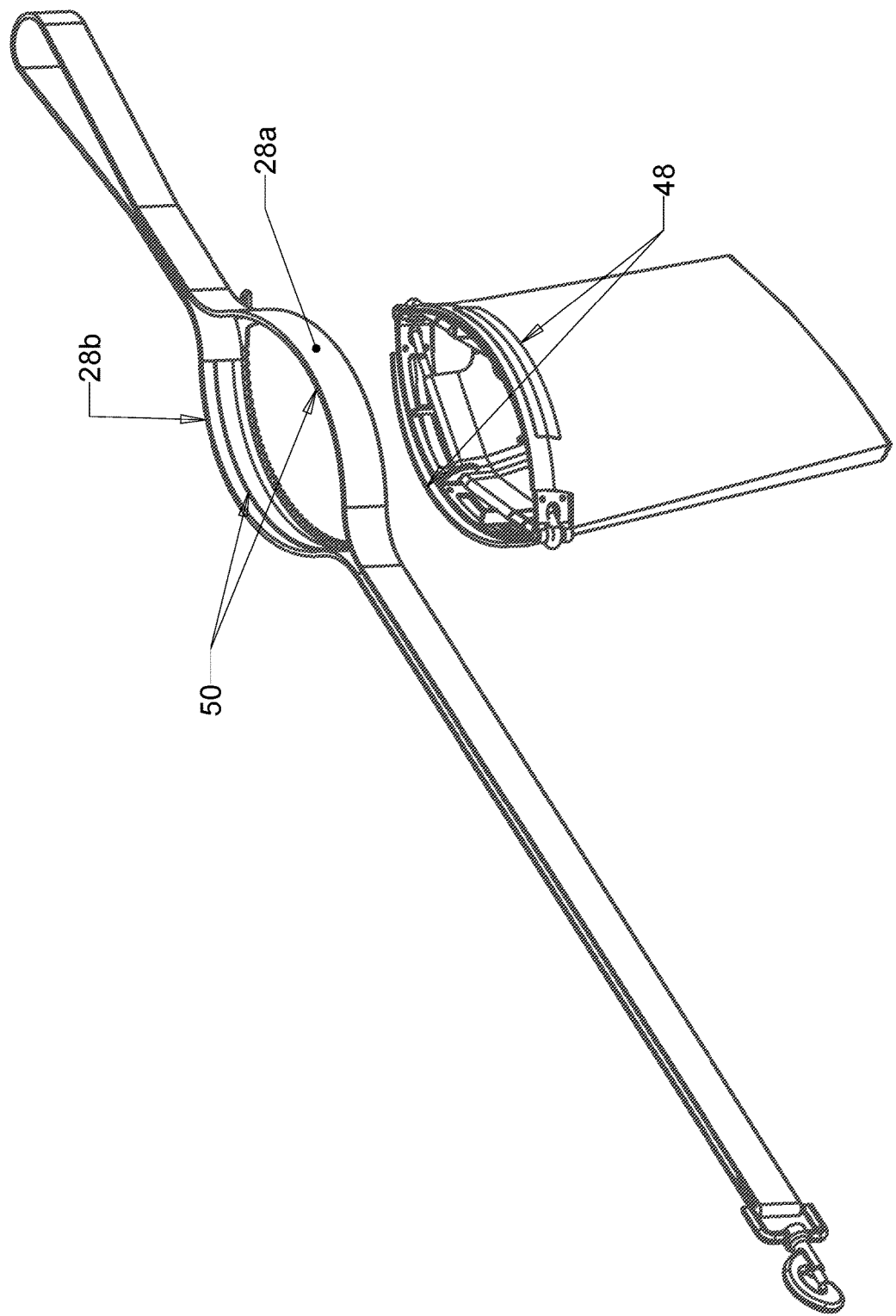
FIG. 20 shows an example of how the resilient frame can be secured to the leash.

The pouch 22 can be permanently or non-removably attached to the frame 30. Alternatively, the pouch 22 can be non-permanently or removably attached to the frame 30 using a removable attachment mechanism such as hook and loop fasteners. As indicated above, if the pouch 22 is not used, the disposable plastic bag can be removably fixed to the frame 30. In addition, referring to FIG. 20, the frame 30 can be non-permanently or removably attached to the leash portions 28a, 28b using a removable attachment mechanism. For example, as shown in FIG. 20, the exterior surfaces of the frame portions 34a, 34b can include a first portion 48 of a hook and loop attachment mechanism, while the interior surfaces of the leash portions 28a, 28b can include a second portion 50 of the hook and loop fastening mechanism intended to engage with the first portion 48.

Returning to FIGS. 7 and 8, the pouch 22 has an opening 52 that can be zippered-closed using a zipper mechanism 54 or other form of closure mechanism. In the illustrated embodiment, the zipper mechanism 54 is attached to the pouch 22. In particular, one-half of the zipper teeth of the zipper mechanism 54 is provided on one side of the pouch 22 and the other half of the zipper teeth are provided on the other side of the pouch 22, and a zipper pull 56 is used to draw the two parts of the zipper teeth together. In an alternative embodiment, the zipper portions can be attached to the leash portions 28a, 28b, and the frame portions 34a, 34b can be secured to leash portions 28a, 28b. The pouch 22 can then be removably secured to the outside of the leash portions 28a, 28b. This would make installation of the pouch 22 easier, and the pouch 22 would be the only item being washed.

Figure 11:
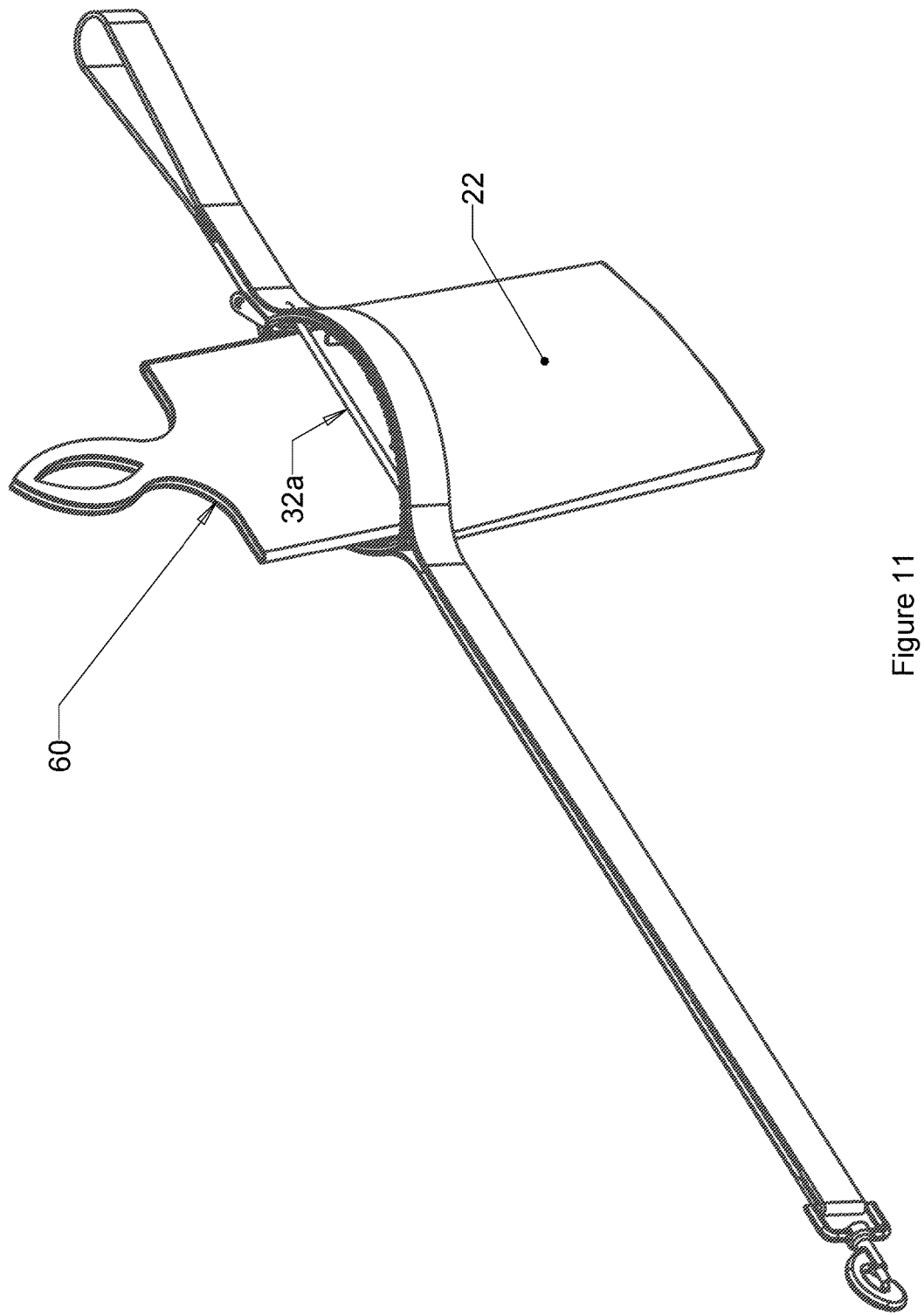
FIG. 11 illustrates a disposable bag being inserted into the pouch of FIG. 7.
Figure 12:
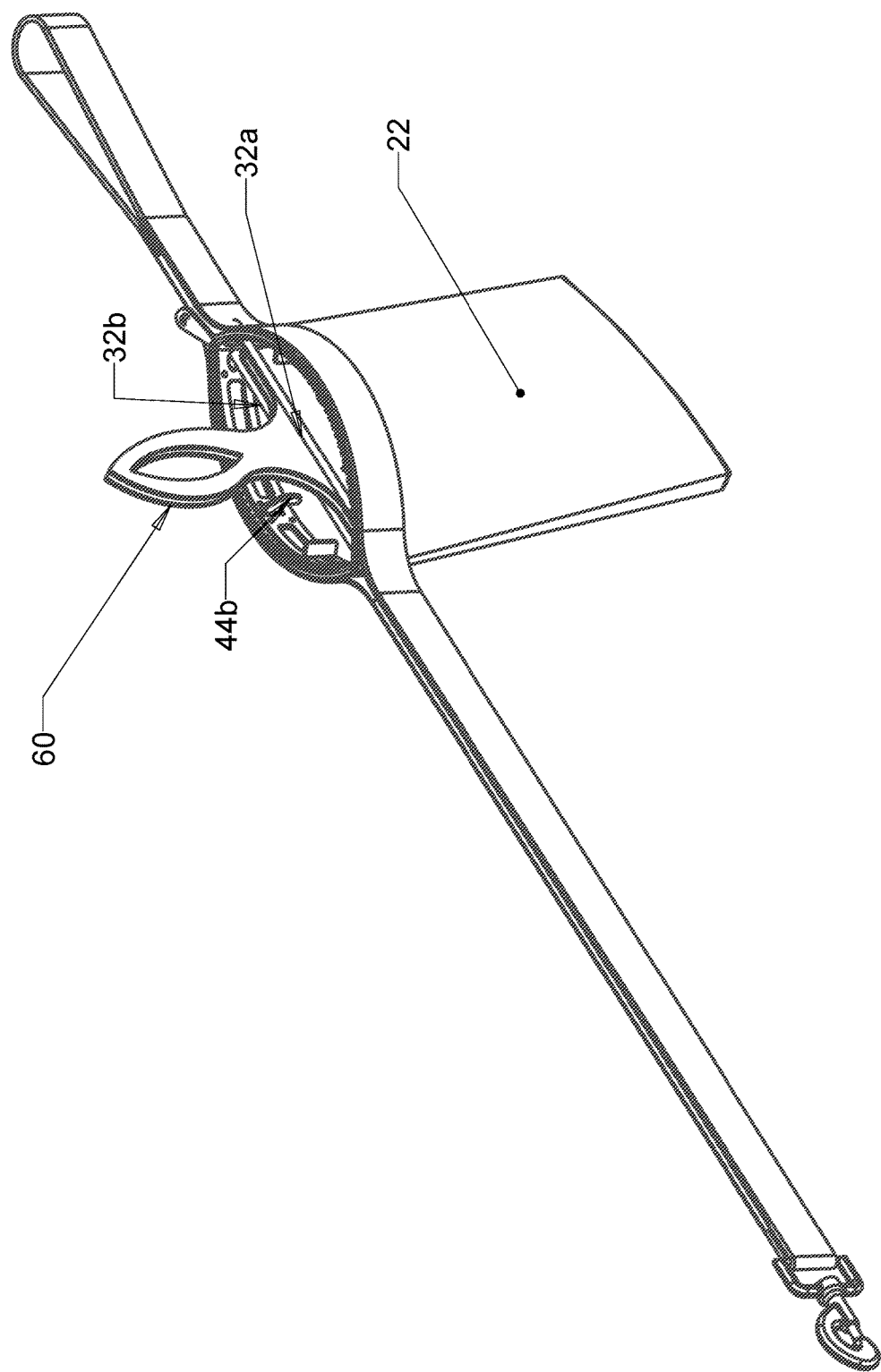
FIG. 12 illustrates the disposable bag of FIG. 11 inserted into the pouch.
Figure 13:
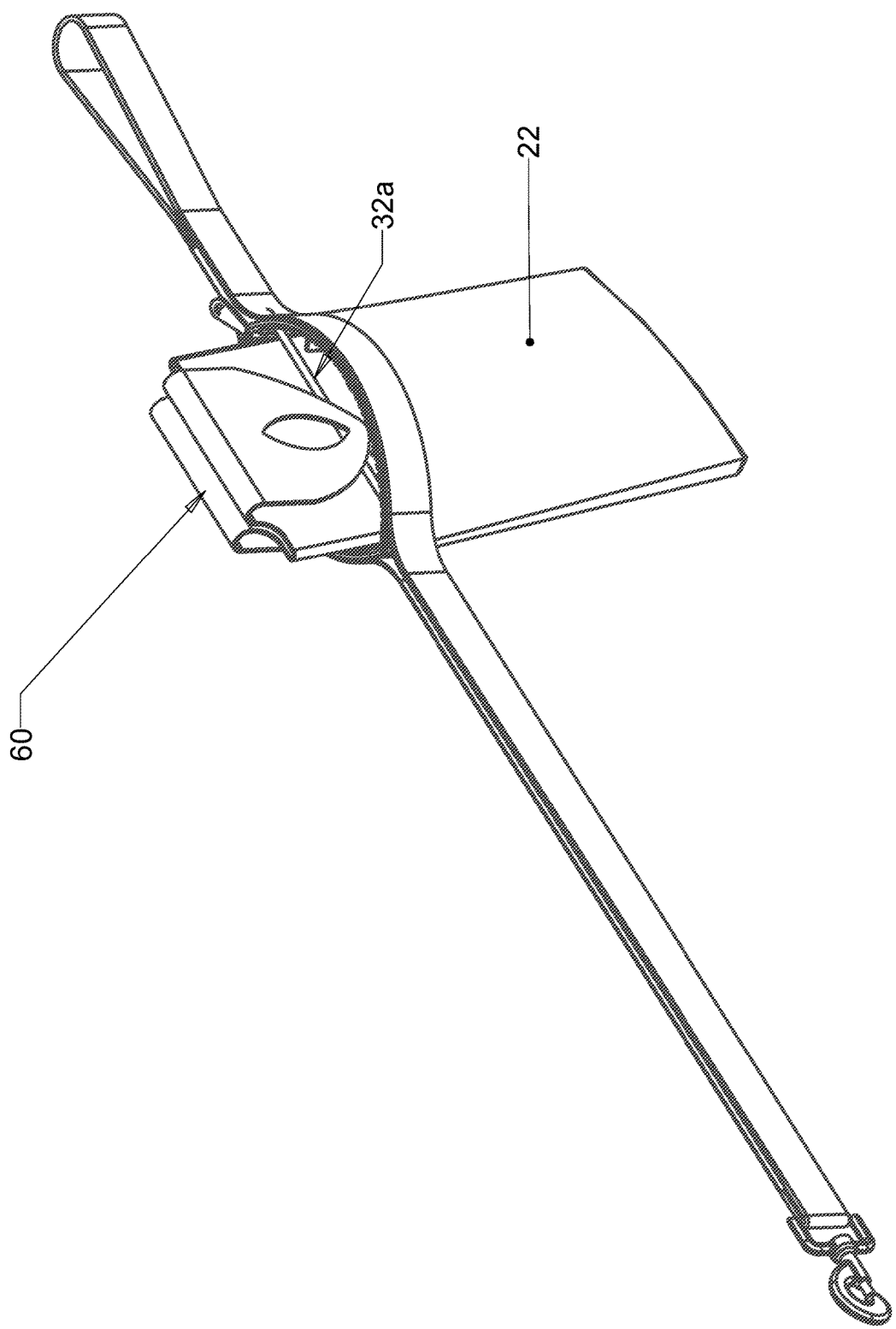
FIG. 13 illustrates bag handles of the disposable bag folded outwardly to be tucked between the elastic cords and the resilient frame.
Figure 14:
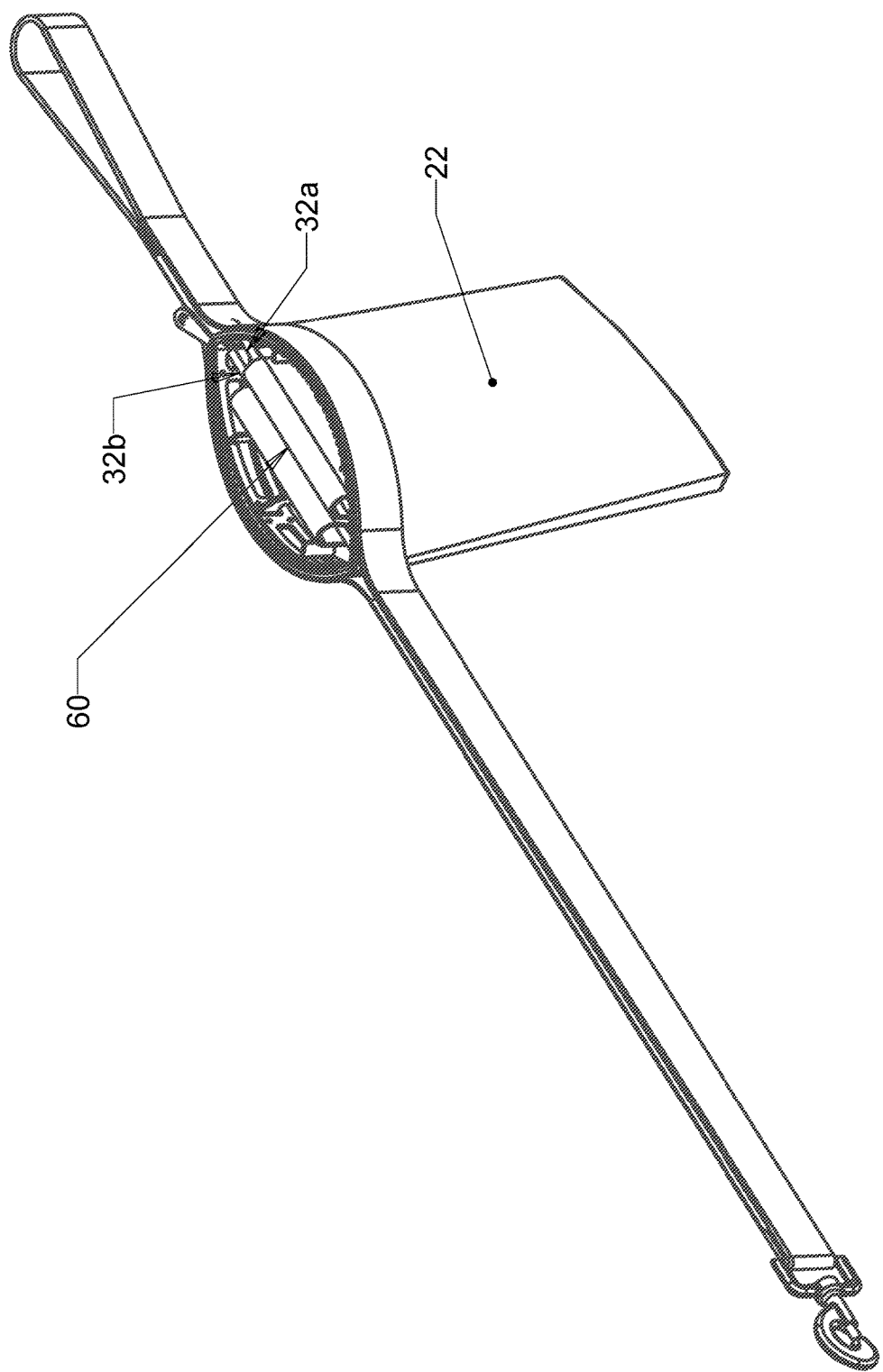
FIG. 14 illustrates the outwardly folded bag handles of the disposable bag tucked between the elastic cords and the resilient frame.

FIGS. 11-16 illustrate installation of a disposable bag 60 in the pouch 22. With the frame 30 attached between the leash portions 28a, 28b, and the zipper mechanism 54 opened, the frame portions 34a, 34b of the resilient frame 30 flex open to their open configuration. The disposable bag 60 is then inserted between the cords 32a, 32b and pushed to the bottom of the pouch 22 as shown in FIGS. 11 and 12. The ends of the disposable bag 60 are then folded outwardly as shown in FIG. 13, and the ends are then tucked between the cords 32a, 32b and the interior surface of each frame portion 34a, 34b as shown in FIG. 14. The elastic cords 32a, 32b are then placed under the hooks 44a, 44b as shown in FIGS. 15 and 16. This retains the disposable bag 60 in place, with the resilient frame 30 keeping the opening 52 of the pouch 22 spread open when it is unzipped and ready for waste retrieval.

Figure 17:
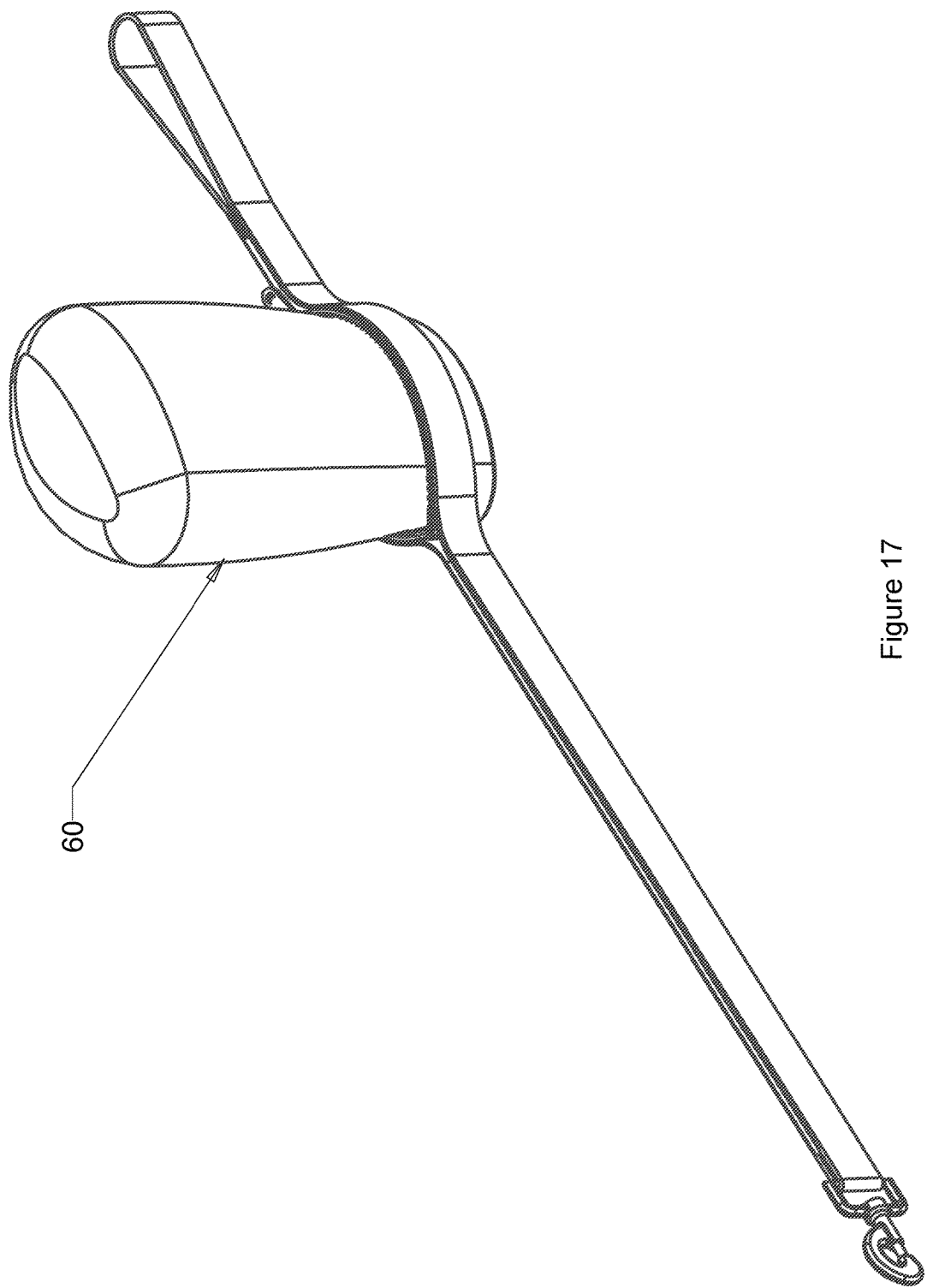
FIG. 17 shows the pouch of FIG. 15 turned inside-out for pet waste retrieval.
Figure 18:
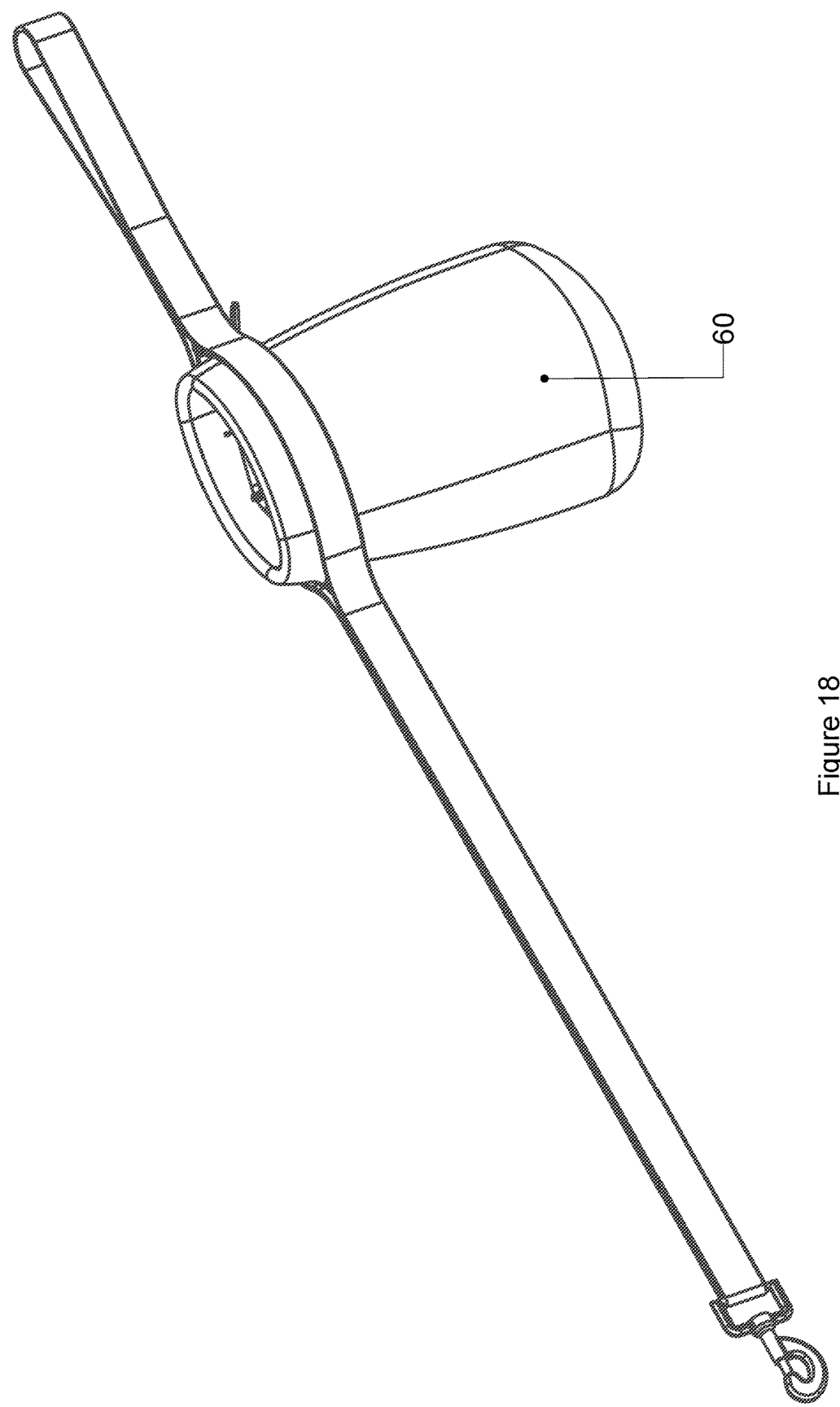
FIG. 18 illustrates the leash and pouch of FIG. 17 flipped over.
Figure 19:
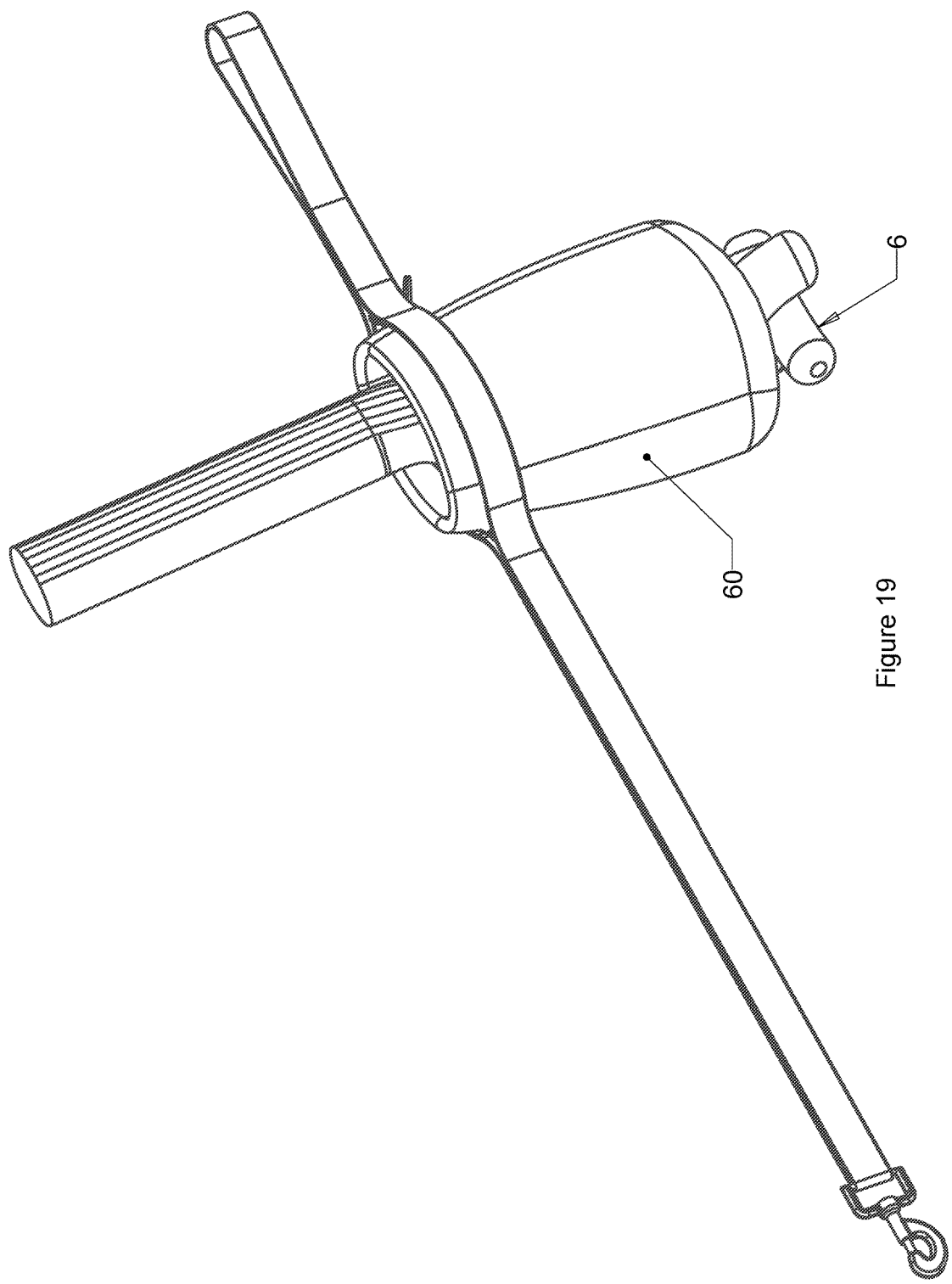
FIG. 19 shows the users hand picking up pet waste using the pouch of FIG. 18.

Referring to FIGS. 17-19, the pouch 22 is then turned inside-out (FIG. 17), the leash 20 and pouch 22 are then flipped over (FIG. 18), and the users hand then picks-up the pet waste 6. The user then draws his hand back through the pouch 22 turning the pouch 22 back to its original position (no longer inside out). The pouch 22 can be closed, for example using the zipper mechanism 54. When the pouch 22 is closed, the elastic cords 32a, 32b help to create a seal with the disposable bag 60. To remove the disposable bag 60 containing the pet waste, the pouch 22 is unzipped or otherwise opened, the elastic cords 32a, 32b unhooked from the hooks 44a, 44b, the ends of the bag 60 pulled upwardly to pull the bag 60 from the pouch 22.

Figure 22:
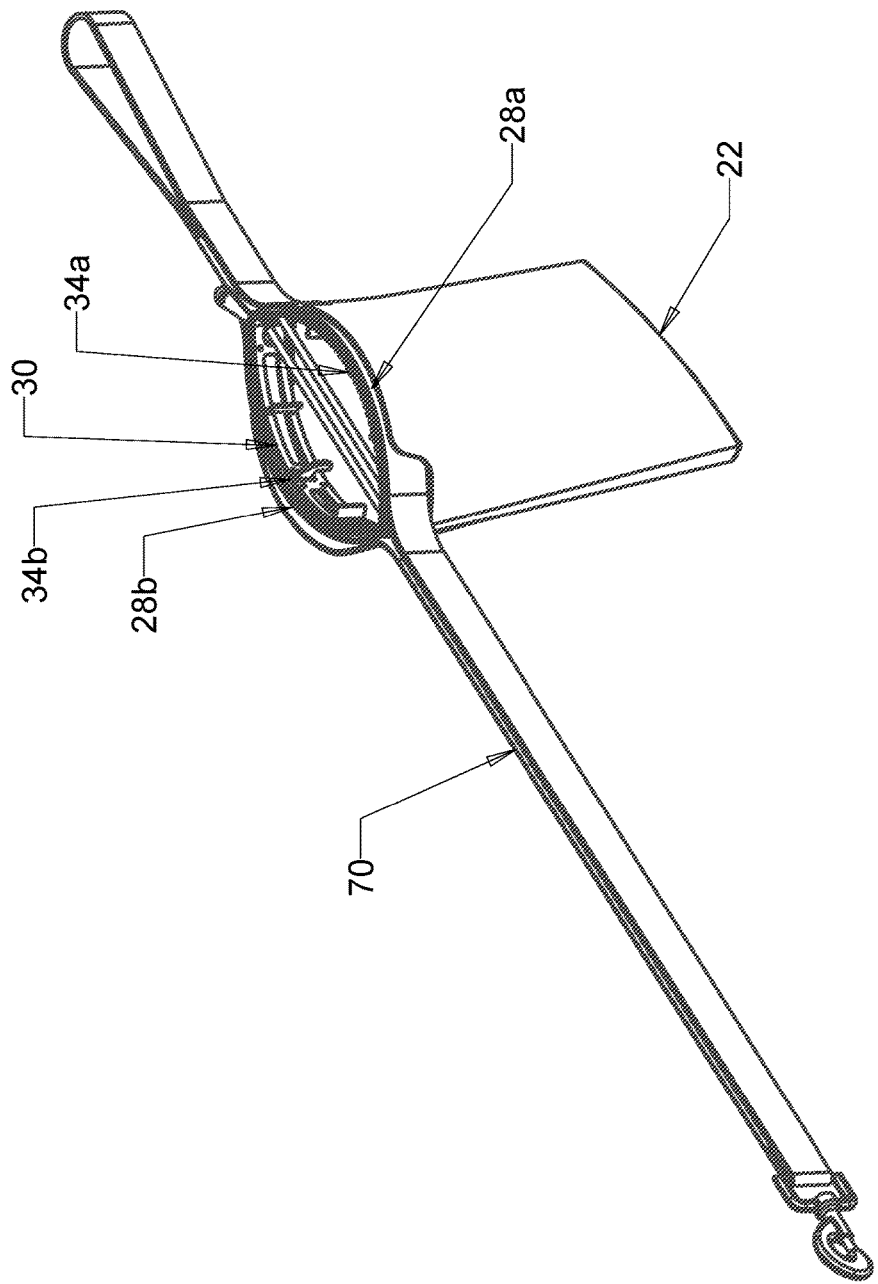
FIG. 22 illustrates an embodiment of a leash where the pouch is attached to the outside of the two leash portions.

FIG. 22 illustrates an embodiment of a pet leash 70 that is generally similar to the embodiment in FIGS. 7-20. However, in this embodiment, the pouch 22 is attached to the outside of the leash portions 28a, 28b using suitable attachment mechanisms such as hook and loop fasteners, snaps, and the like. The resilient frame 30 and the elastic cords 32a, 32b thereof are secured within the leash portions, for example by attaching the frame portions 34a, 34b to inside surfaces of the leash portions 28a, 28b, while the pouch 22 is secured to the outside surfaces of the leash portions 28a, 28b. This embodiment allows easier removal of the pouch 22 and allows washing of the pouch 22 without having to wash the frame 30 and the cords 32a, 32b with the pouch. This embodiment also allows the user to leave the pouch 22 off of the leash 70, and allows use of the leash with only the disposable plastic bag which can be secured to the frame 30 in the manner as described above for FIGS. 7-20.

Figure 23:
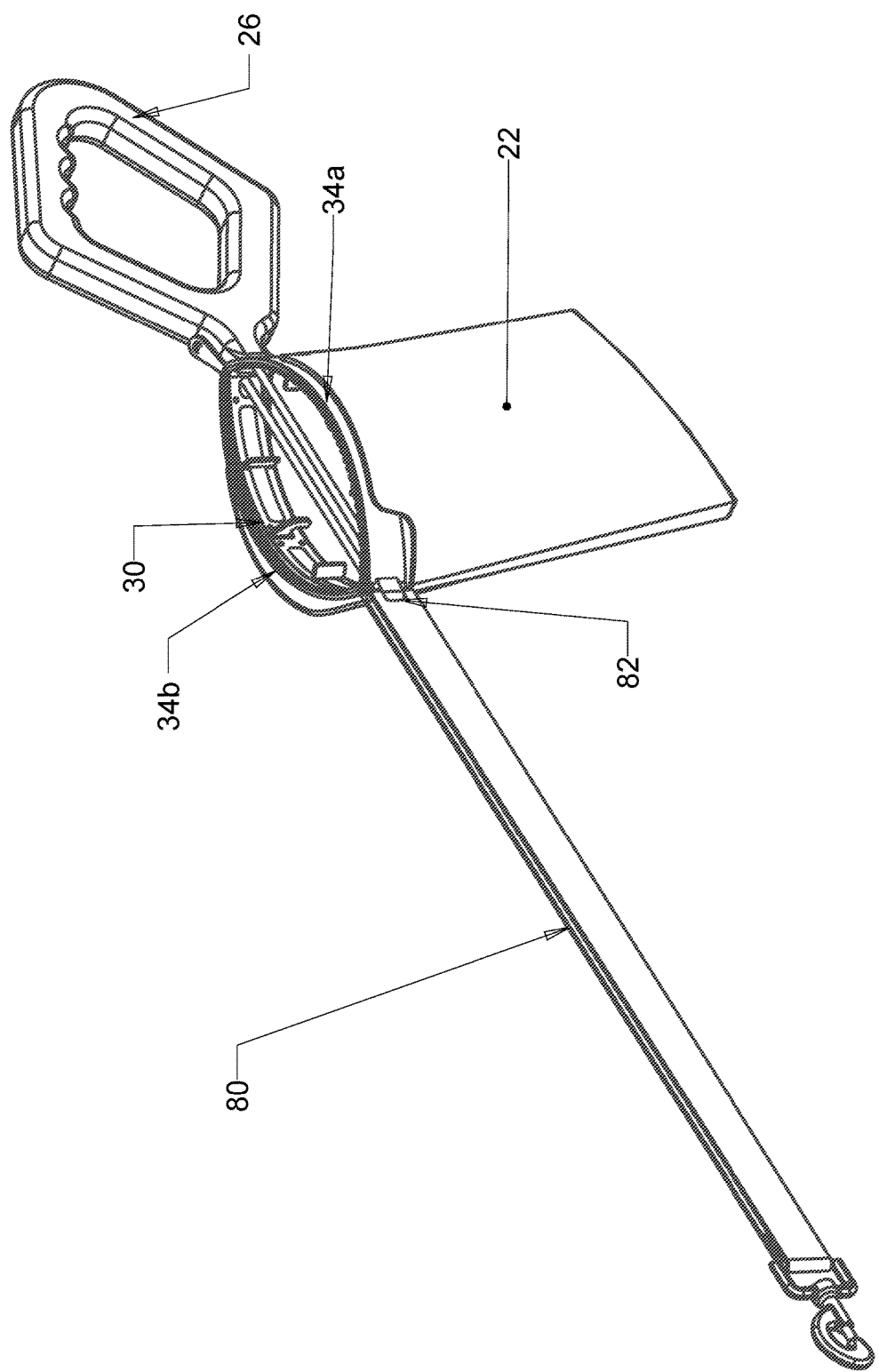
FIG. 23 illustrates still another embodiment of a leash with a plastic handle where the resilient frame is attached directly to plastic handle.

FIG. 23 illustrates an embodiment of a pet leash 80 that is generally similar to the embodiment in FIGS. 7-20. However, in this embodiment, the handle 26 comprises a plastic handle that can be substantially rigid. The end of the resilient frame 30 is attached directly to the end of the handle 26, and an end 82 of the leash webbing or leather is attached to the opposite end of the frame 30. In this embodiment, the pouch 22 can be attached to outer surfaces of the frame portions 34a, 34b. The leash webbing or leather of the leash 80 in this embodiment does not have leash portions that form a loop. Instead, the frame portions 34a, 34b form first and second portions of the pet leash 80 between the pet connection end and the handle end, wherein the first and second portions form a loop.

Figure 24:
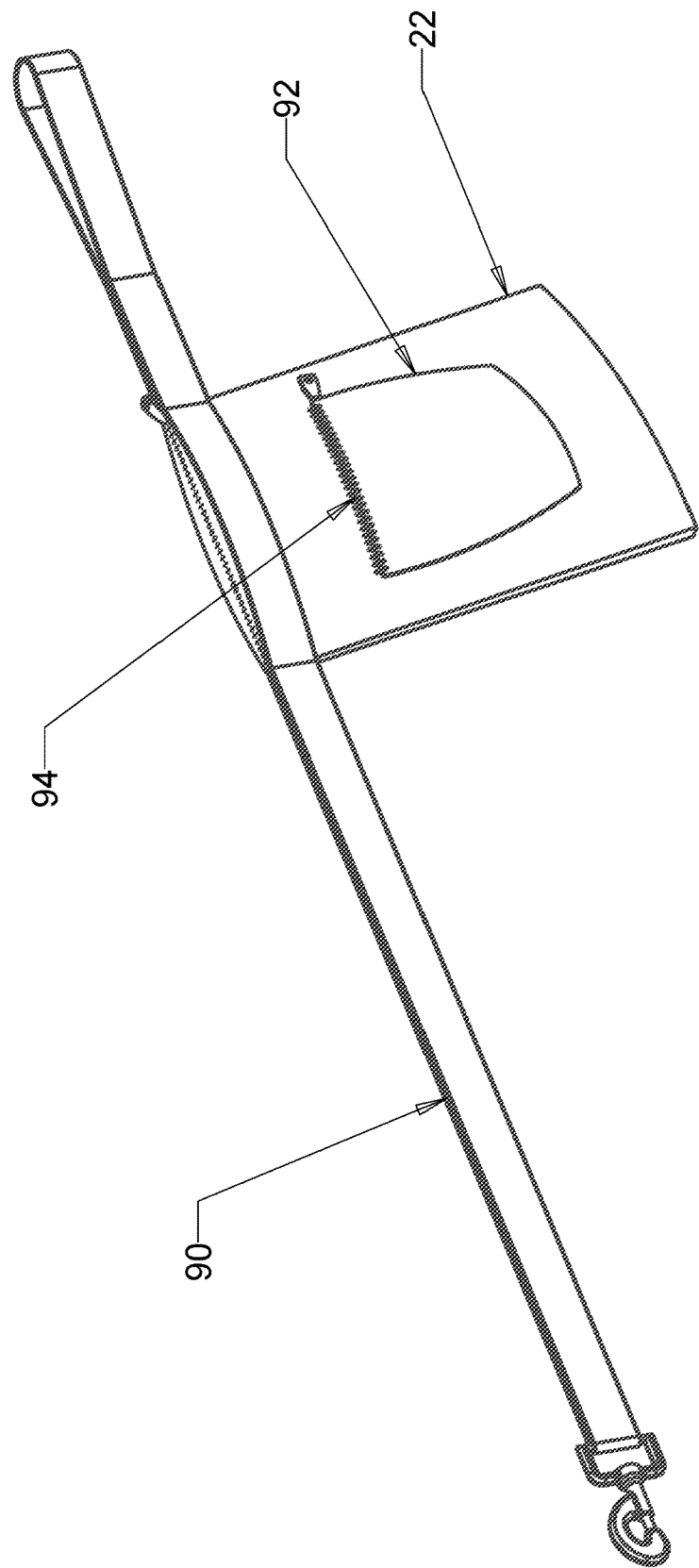
FIG. 24 illustrates still another embodiment of a leash with a closeable pocket on the side of the pouch.

FIG. 24 illustrates an embodiment of a pet leash 90 that is generally similar to the embodiment in FIGS. 7-20. In this embodiment, the pouch 22 includes a pocket 92 on the side thereof. The pocket 92 can be used to carry items such as extra bags, keys, cash, and the like. In one embodiment, the pocket 92 can be closeable by a closing mechanism 94 at an openable end thereof. The closing mechanism 94 can be any mechanism that can be used to selectively close the openable end of the pocket 92. Examples of closing mechanism 94 that can be used include, but are not limited to, a zipper (illustrated in FIG. 24), hook and loop fasteners, one or more snaps, and the like.

Figure 25:
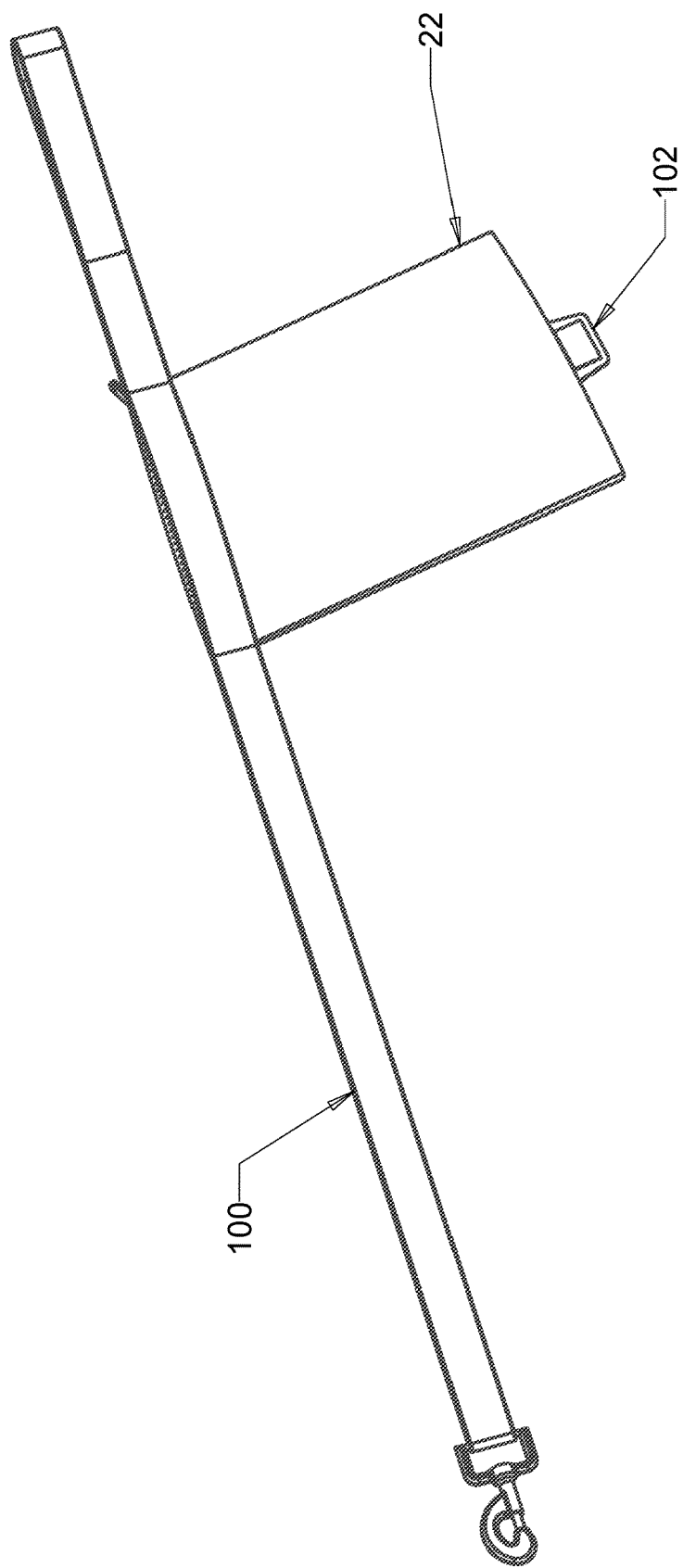
FIG. 25 illustrates still another embodiment of a leash with a tab to secure the pouch in a rolled-up configuration.
Figure 26:
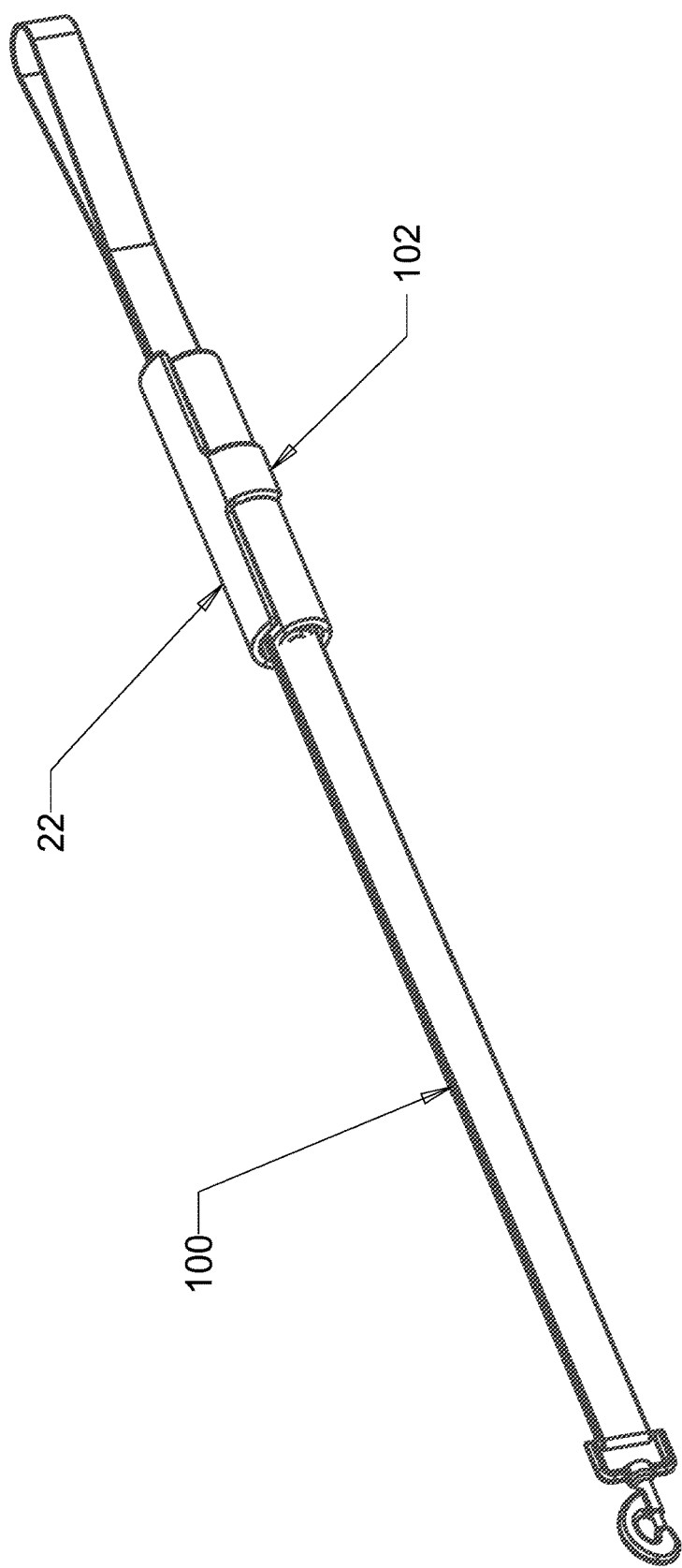
FIG. 26 illustrates the pouch of FIG. 25 in the rolled-up configuration.

FIGS. 25-26 illustrate an embodiment of a pet leash 100 that is generally similar to the embodiment in FIGS. 7-20. In this embodiment, the pouch 22 can be rolled up around the two leash portions. FIG. 25 illustrates the bottom end of the pouch 22 as including a fastener 102 that can be used to secure the pouch 22 in the rolled-up configuration shown in FIG. 26. The fastener 102 can be any fastener that can releasably secure the pouch 22 in the rolled-up configuration. For example, the fastener 102 include, but is not limited to, a hook patch or a loop patch of a hook and loop fastener (the corresponding hook or loop patch would be located on the other side of the pouch 22), a portion of a snap mechanism (the other portion of the snap mechanism would be on the other side of the pouch 22), and the like.

Figure 27:
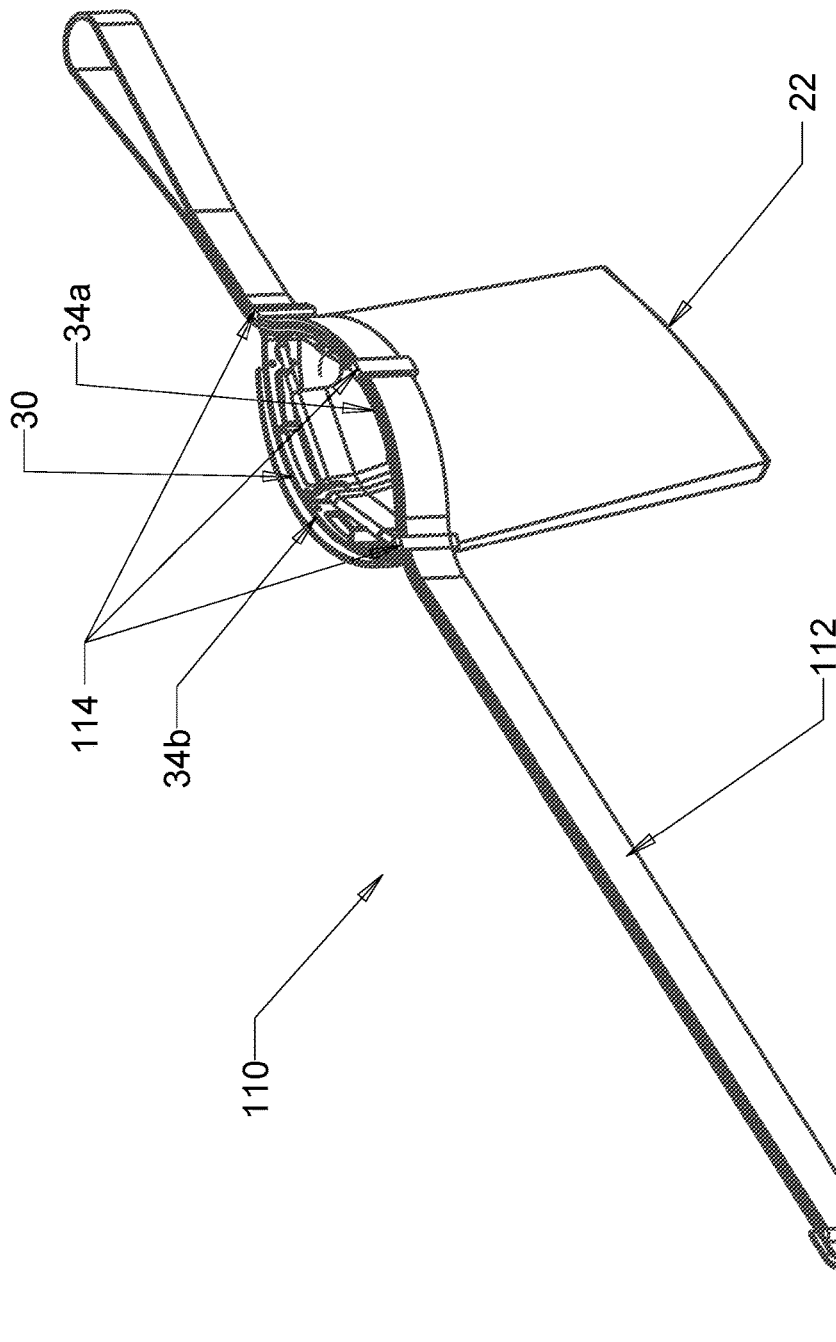
FIG. 27 illustrates still another embodiment of a leash with retaining members.

FIG. 27 illustrates an embodiment of a pet leash 110 where the frame 30 is secured to a conventional leash 112 without the two leash portions forming a loop. In this embodiment, the webbing of the leash 112 extends along one side of the frame 30 (such as along the frame portion 34a as illustrated or along the frame portion 34b) and the leash webbing is detachably secured to the frame 30 by a suitable fastening mechanism. In the illustrated example, the fastening mechanism comprises at least one, or plurality of, retaining member(s) 114 such as retaining clips or the like that clip onto the leash webbing and the frame 30. In this embodiment, one of the frame portions 34a, 34b is not covered by the leash webbing. This embodiment permits the use of existing leashes with the frame 30.

Any of the features in FIGS. 21, 22, 23, 24, 25-26 and 27 can be used individually or collectively with one another, or used individually or collectively with any of the features in FIGS. 1-6 or FIGS. 7-20.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An apparatus, comprising:
   a pet leash having a pet connection end and a handle end;
   a resilient frame secured to the pet leash, the resilient frame is moveable between an open configuration and a closed configuration, and the resilient frame is biased to the open configuration, and the resilient frame includes a bag retention mechanism;
   the pet leash includes first and second portions between the pet connection end and the handle end, wherein the first and second portions form a loop, and the resilient frame is secured to the first and second portions within the loop formed thereby;
   a pouch secured to the resilient frame;
   the pouch defining an interior space, an upper end secured to the resilient frame, and a closed bottom end; the upper end of the pouch being open when the resilient frame is at the open configuration and the upper end of the pouch being closed when the resilient frame is at the closed configuration;
   a disposable bag removably secured within the interior space of the pouch and lining walls of the pouch; the disposable bag having an upper end adjacent to the upper end of the pouch and releasably secured to the bag retention mechanism, and the disposable bag having a closed bottom end adjacent to the closed bottom end of the pouch, whereby the upper end of the disposable bag is open when the upper end of the pouch is open, and the upper end of the disposable bag is closed when the upper end of the pouch is closed.

2. The apparatus of claim 1, wherein the pouch is removably secured to the resilient frame.

3. The apparatus of claim 1, wherein the loop is located at a position that is closer to the handle end than to the pet connection end.

4. A pet leash comprising:

an elongated, flexible leash having a pet connection end and a handle end;

a resilient frame secured to the leash, the resilient frame includes a pair of frame portions that can flex between an open configuration and a closed configuration, and the frame portions of the resilient frame are biased to the open configuration, and the resilient frame includes a bag retention mechanism having first and second elastic members and a retainer on each frame portion, the first elastic member is engageable with the retainer on one of the frame portions and the second elastic member is engageable with the retainer on the other frame portion;

a pet waste pouch secured to the frame portions of the resilient frame; the pet waste pouch having a first end secured to the frame portions, and a closed second end; the first end being open when the frame portions are at the open configuration and the first end being closed when the frame portions are at the closed configuration;

the pet waste pouch defines an interior space;

a disposable bag removably secured within the interior space of the pet waste pouch and lining walls of the pet waste pouch;

the disposable bag having a first end adjacent to the first end of the pet waste pouch and releasably secured to the bag retention mechanism to releasably secure the disposable bag within the pet waste pouch, and the disposable bag having a closed second end adjacent to the closed second end of the pet waste pouch;

whereby the first end of the disposable bag is open when the first end of the pet waste pouch is open, and the first end of the disposable bag is closed when the first end of the pet waste pouch is closed.

5. The pet leash of claim 4, wherein the elongated, flexible leash is split into first and second portions between the pet connection end and the handle end, the first and second portions form a loop; and the frame portions of the resilient frame are secured to the first and second portions within the loop formed thereby.

6. The pet leash of claim 4, further comprising a closure mechanism connected to the first end of the pet waste pouch, the closure mechanism is configured to open and close the first end of the pet waste pouch.

7. The pet leash of claim 4, wherein the pet waste pouch is detachably secured to the frame portions of the resilient frame.

* * * * *